(12) United States Patent
Leman et al.

(10) Patent No.: US 10,066,967 B2
(45) Date of Patent: Sep. 4, 2018

(54) POSITION DETECTION OF A 1-COIL OR 2-COIL MOTOR

(71) Applicant: MELEXIS TECHNOLOGIES NV, Tessenderlo (BE)

(72) Inventors: Dirk Leman, Lier (BE); Marc Lambrechts, Kessel-Lo (BE); Zuo Xing, Guangdong (CN); Zhang Huowen, Shanghai (CN)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 0 days.

(21) Appl. No.: 15/468,730

(22) Filed: Mar. 24, 2017

(65) Prior Publication Data

US 2017/0284832 A1   Oct. 5, 2017

(30) Foreign Application Priority Data

Apr. 1, 2016   (EP) .................................. 16163499

(51) Int. Cl.
  *G01D 5/20*   (2006.01)
(52) U.S. Cl.
  CPC .................................. *G01D 5/2006* (2013.01)
(58) Field of Classification Search
  CPC ......... G01D 5/2013; G01D 5/202; G01B 7/14
  See application file for complete search history.

(56) References Cited

U.S. PATENT DOCUMENTS 5,254,914 A   10/1993   Dunfield et al.
5,598,071 A   1/1997   Dunfield et al.
7,388,367 B2   6/2008   Stauder et al.
2001/0045812 A1   11/2001   Seki et al.
2003/0011333 A1*   1/2003   Kawabata .......... G11B 7/08529
          318/400.21
2005/0093491 A1   5/2005   Kruger et al.
2005/0283324 A1*   12/2005   Swanson ................ H02P 6/185
          702/57
2007/0252587 A1   11/2007   Stauder et al.
          (Continued)

FOREIGN PATENT DOCUMENTS

EP   1683261 A1   7/2006
WO   2005046043 A1   5/2005

OTHER PUBLICATIONS

European Search Report from EP Application No. 16163499.3, dated Oct. 13, 2016.

*Primary Examiner* — Jermele M Hollington
*Assistant Examiner* — Alvaro Fortich
(74) *Attorney, Agent, or Firm* — Workman Nydegger

(57) ABSTRACT

A method for detecting rotor position for a single coil DC motor or 2-coil DC motor with non-parallel windings, with no need of Hall position sensor. The method comprises applying a first respectively second probe pulse for generating a first response pulse having a first direction or polarity and a second response pulse having a second direction or polarity. The probe pulses are adapted so they do not substantially move the rotor with respect to the stator, but affect the magnetic properties of the stator. By comparing the measured effects caused by the probe pulses, the initial position of the rotor with respect to the stator is determined. A method for start-up, a motor driver circuit, and a motor assembly comprising said motor and driver circuit are also provided.

16 Claims, 16 Drawing Sheets

(56) References Cited

U.S. PATENT DOCUMENTS

2008/0061724 A1   3/2008  Hao et al.
2012/0287759 A1* 11/2012  Manaka ................ G04C 3/143
                                                368/80

* cited by examiner

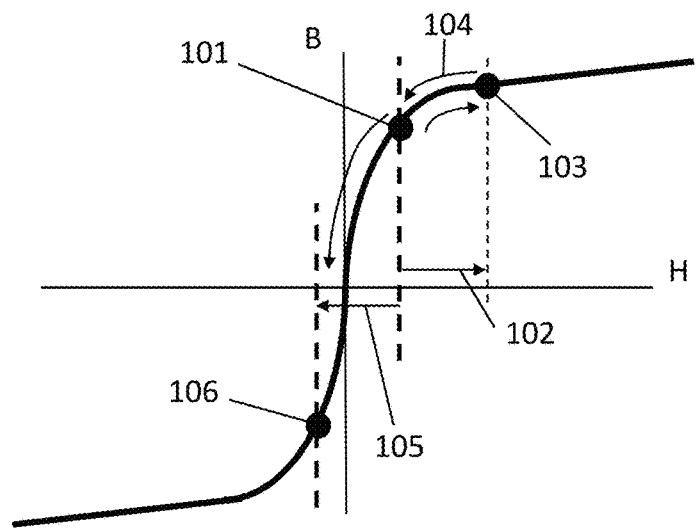
FIG. 1
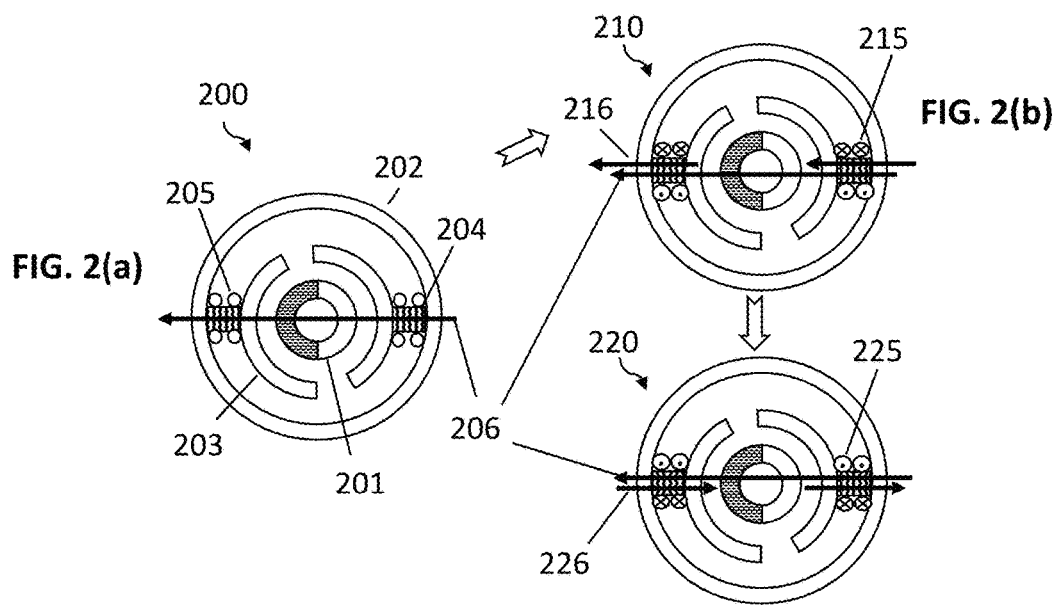
FIG. 2(a)
FIG. 2(b)
FIG. 2(c)

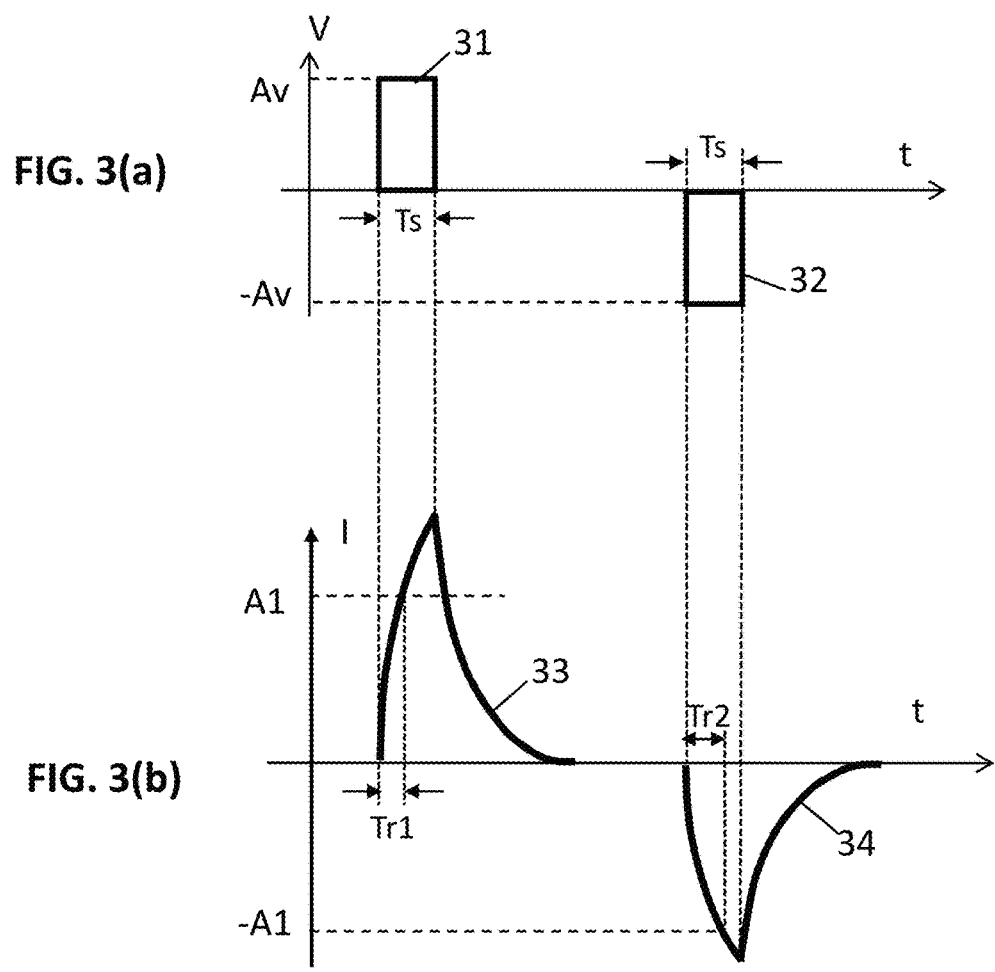

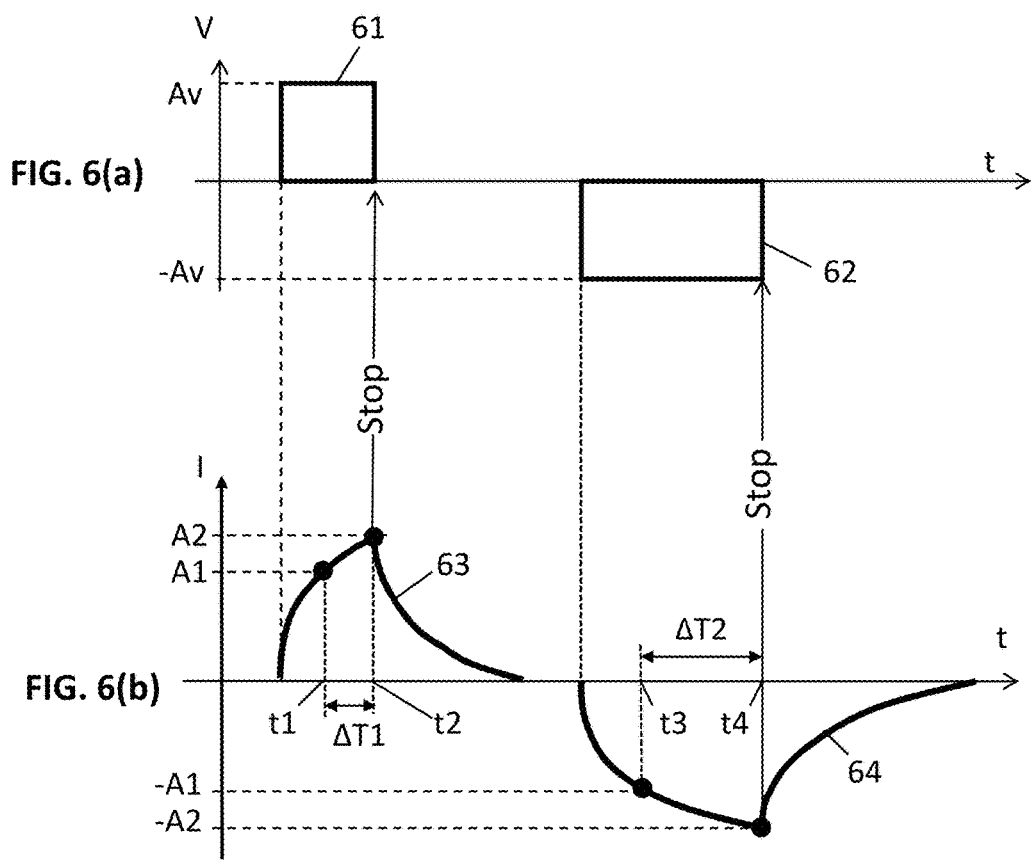

POSITION DETECTION OF A 1-COIL OR 2-COIL MOTOR

FIELD OF THE INVENTION

The present invention relates to the field of single-phase DC motors or two-phase DC motor without parallel wound coils. The present invention is not related to 2-coil motors where the two coils are wound parallel on each of the stator poles.

BACKGROUND OF THE INVENTION

Single-phase and two-phase motors are widely used in a broad range of applications, from automotive applications to white appliances or industrial applications, as well as consumer applications like CPU cooling, and power supply cooling. Despite the fact that such motors are widely applied, and many people are able to apply existing designs, only a very small group of people has sufficient knowledge and experience to actually design a motor driver for single-phase motors.

The startup of a motor comprises applying a current in the stator coil in a specific direction for a single-phase motor, or to draw current through the applicable coil of a 2-phase motor. The direction of the current (or which coil for 2-phase motors) is depending on the position of the rotor versus the stator, and more specific the position of the individual poles of the permanent magnets versus the stator, in order to guarantee the start up in the correct direction. In single-phase motors, the coil is wound such that the stator shoes for a given current direction cause magnet fields in alternating directions-field lines from stator shoe towards the rotor, or vice versa. In some two-phase motors, the 2 coils are wound on alternating stator poles.

Typically, single-phase and two-phase motors have rotors with two pole pairs, or four poles. The magnetic poles on the rotor are per default also alternating North and South poles. Consequently, the two North poles and South poles face stator shoes with coils wound in the same direction. In general, and especially after power-on-reset, the initial position of the rotor is unknown.

In the prior art the typical method to detect which pole is facing which coil winding direction, is based on a hall sensor which is applied in the vicinity of the rotor, and which measures the local magnetic field. This informs the fan-driver in which direction the current must be applied through the coil to ensure correct start up direction. If the motor is started in the "incorrect" direction, the rotor may become stuck in a zero-torque position before having gained sufficient inertia. This is a first fundamental difference between for example three-phase BLDC motors on the one hand, and single-phase and two-phase motors on the other hand, because zero torque positions exist for the single-phase and two-phase motors (as illustrated in FIG. 13), but not for three-phase motors, and the rotor has the tendency to stop at such position because it is the position of lowest reluctance as well. Hence, techniques that are known for three-phase motors do not by definition also work for single-phase motors.

Typically, 1-coil and 2-coil motors have four stator shoes, as illustrated in the exemplary motor shown in FIG. 14. Each stator shoe causes such a zero torque position, so there are four zero-torque positions per motor. In order to ensure startup, an asymmetrical air gap (distance "gap1" being different from distance "gap2") is typically provided by design in single coil fans, to ensure the fan stops next to the zero torque position, more specifically on that side of the zero torque position which is the most favorable start up direction, i.e. the position further away from the "next" zero torque position, so that the motor will have gained sufficient inertia for passing this zero torque position, provided that the correct start-up sequence is applied. In case the incorrect current direction is applied to the stator coil, the rotor will be pulled into the zero torque position, which may lead to stall (locked rotor), or a start-up in the incorrect direction.

Rotating in the correct direction is important, because single-coil motors are often used for driving a fan, and the blades of fans are typically designed to rotate in one specific direction. Hence, if the motor is started-up incorrectly, and rotates in the incorrect direction, the wind is flowing in the wrong direction, and the fan will not provide the envisioned cooling, which is highly undesirable.

Another problem with single-coil or two-coil motors is that there is no simple way, other than by using the position sensor, e.g. Hall sensor, to detect in which direction the rotor is running. Hence, simply omitting the position sensor, and trying to start-up in a random way, and if not correct, trying again, is not an option.

Therefore, it is important to know the position of the rotor in order to correctly start a single-phase or two-phase motor.

As far as is known to the inventors, most or all existing single-coil or dual-coil motors without parallel wound coils use position sensors, such as Hall sensors, to determine the initial position, simply because it is the only reliable technique known today, despite the fact that such a sensor increases the cost of the motor driver, e.g. fan-driver electronics.

There is always room for improvements or alternatives.

SUMMARY OF THE INVENTION

It is an object of embodiments of the present invention to provide a good method of detecting an initial position of the rotor of a single-phase DC motor or of a 2-phase DC motor without two parallel coils, and to provide a good motor driver circuit for implementing such a method, and to provide a good motor assembly comprising such a motor driver circuit.

It is a particular object of the present invention to provide a sensor-less motor drive circuit and a sensor-less motor assembly, and a method for reliably starting such a motor in the correct direction, having a reduced cost.

It is a particular object of the present invention to provide a sensor-less motor drive circuit and a sensor-less motor assembly, and a method for reliably starting such a motor in the correct direction, without using a position sensor or a Hall sensor.

It is an object of particular embodiments of the present invention to provide a relatively simple method that can be implemented in a simple and relatively inexpensive way.

In a first aspect, the present invention provides a method of determining an initial position of a single-phase DC motor, or of a two-phase DC motor without parallel wound coils, the motor having a stator comprising magnetic material and at least one but less than three coils, and a rotor movably mounted with respect to the stator, the method comprising the steps: a) applying at least one first probe pulse to the at least one coil thereby generating a first response pulse having a first direction or a first polarity, and measuring an effect of the at least one first probe pulse; b) applying at least one second probe pulse to the at least one coil thereby generating a second response pulse having a second direction or second polarity, and measuring an effect of the at least one second probe pulse; wherein the at least one first probe pulse and the at least one second probe pulse have a shape and size sufficiently small for not substantially moving the rotor relative to the stator, and have a shape and size sufficiently large so as to cause at least partial saturation of the magnetic stator material; c) determining the initial position of the rotor with respect to the stator by comparing the measured effect of the at least one first probe pulse and the measured effect of the at least one second probe pulse.

The magnetic material may be a soft magnetic material.

In case the first and second probe pulse is a first and second voltage pulse, the first and second response pulse is a first and second current pulse. In case the first and second probe pulse is a first and second current pulse, the first and second response pulse is a first and second voltage pulse.

Measuring an effect of the first and second probe pulse is performed by measuring a characteristic of the first and second response pulse.

In case of a single-phase motor, the first and second probe pulse is applied to the same coil, but the first and second probe pulse have opposite (current) directions or opposite (voltage) polarities. In case of a 2-phase motor, the first probe pulse is applied to the first coil, and the second probe pulse is applied to the second coil, and they may have the same or opposite direction or polarity, depending on how these pulses are applied.

It is an advantage of using a first and second probe pulse having a shape and size sufficiently small in order not to substantially move the rotor with respect to the stator, to avoid the rotor making an electrical step, and preferably to avoid it getting stuck at a zero torque position.

It is an advantage of embodiments of the present invention that an angular position sensor, such as a Hall sensor is redundant, and thus can be omitted, while obtaining a reliable and robust determination of the rotor position with respect to the stator in a compact way without the need of expensive sensors.

It is a further advantage that embodiments of the present invention may be applied to a wide range of single coil or even 2-coil DC motors, which may be calibrated at factory level; or easy and fast calibration, accounting for environmental variables, may be taken into account in the field, e.g. before each use of the motor.

The probe voltage pulse can for example have a substantially rectangular shape, which is relatively easy and simple to make, for example using a switch and a voltage source and a mechanism for closing and opening the pulse. The probe current pulse can for example be made by a current source. The size of a rectangular pulse can be defined by two independent parameters: the pulse height and the pulse duration. In preferred embodiments, the amplitude of the probe pulse is substantially constant (and in case of a voltage pulse, is preferably defined by the voltage of the power supply). But the present invention is not limited to only rectangular pulses, and other pulses may also be used, such as for example a pulse having a triangular shape or a trapezoidal shape.

The motor may be a single-coil or 2-coil DC motor comprising a permanent magnetic rotor and a ferromagnetic stator. Preferably the motor is of the kind that comprises means (e.g. an asymmetric air gap) for making the rotor stop at a favorable side of a zero torque position.

The last step of "determining the initial position" may comprise: choosing a most likely position out of two possible positions, based on the outcome of said comparison, assuming the motor is not stuck in a zero-torque position.

In an embodiment, the shape and size of the at least one first probe pulse and the shape and size of the at least one second probe pulse is a single predetermined shape and size.

In the example of a rectangular probe pulse, this means that the pulse height and the pulse duration are both predetermined. In other words, these pulses have the same amplitude in absolute value, but the same sign (optional in case of 2-phase motor) or an opposite sign (optional is case of 2-phase motor, mandatory in case of single-phase motor).

In an embodiment, the method further comprises a step d) preceding step a) of selecting a probe pulse from a set of predefined probe pulses, step d) comprising the steps of: i) measuring a temperature or a temperature dependent value; ii) comparing the measured temperature or the measured temperature dependent value with at least one predefined value from a set of predefined values; iii) depending on an outcome of the comparison, choosing one predefined shape and size from the set of predefined probe pulses;

or step d) comprising the steps of: iv) measuring a selection value stored in a non-volatile memory-location; v) depending on the selection value, choosing one predefined shape and size from the set of predefined probe pulses.

The temperature dependent value may for example be a forward voltage of a diode or the like. If the set contains only two predefined pulses, a single comparison would be sufficient. Such comparison can be implemented using a single comparator. If the set contains more than two predefined voltage pulses, a look-up table may be implemented.

The value stored in non-volatile memory may for example be an index value written during production, for example as the result of an End-Of-Line test, for example based on measurements of a particular motor, or based on tolerances, etc.

It is an advantage of this embodiment that there are at least two shapes and sizes implemented, and that the most appropriate shape and size can dynamically be determined, for example as a function of temperature, or depending on one or more values stored in a memory during production. In this way the risk of inadvertently moving the rotor (e.g. in case a slightly too large probe pulse is applied than was actually needed) is reduced or minimized, and at the same time the risk of false detection (e.g. in case a slightly too small probe pulse than could be applied is used) is also reduced. Thus, this method provides an improved reliability.

It is an advantage that such method allows to find a suitable shape and/or size, for allowing guaranteed start-up of the motor over a larger temperature range.

It is an advantage of embodiments of the present invention that the shape and/or size of the probe pulses can be optimized during each use, advantageously avoiding moving the motor one electric step or even moving the motor at all, while at the same time reducing the risk of demagnetization of the rotor.

In an embodiment, step a) and step b) comprise: applying a first respectively second probe pulse and having a first predetermined shape and size, optionally based on a measured temperature or a temperature dependent value or a selection value measured from a non-volatile memory; and the method further comprises a step e) following step b) and preceding step c), of:

e) repeating at least once step a) and step b) using a subsequent or further first and second probe pulse having a second or further shape and size different from the shape and size used in a previous iteration; and the method further comprises a step f) following step e), of:

f) to determine whether partial saturation of the magnetic material has occurred or has occurred in a predefined degree based on the measured first effect and the measured second effect, and if partial saturation has not occurred or has not occurred in the predefined degree, to continue with step e) of performing another iteration with an increased shaped and/or size as was used in the previous iteration, and if partial saturation has occurred or has occurred in the predefined degree, to continue with step c) of determining the position.

In an embodiment, the probe pulses may all have a rectangular shape, and only the size is varied. In some embodiments only the pulse height is gradually increased in each iteration, but the duration is kept constant. In other embodiments the height is kept constant but the duration is gradually increased. In yet other embodiments both the height and the duration are gradually increased.

Determining whether partial saturation has occurred in a predefined degree can be based for example on the degree of non-linearity of the measured effect versus the size of the applied probe pulses, or on the slope of the measured effects, or on a difference between the effect of the first and second pulse, or combinations thereof, or in any other way.

It is an advantage that such method allows to find an even more suitable shape and/or size, for allowing guaranteed start-up of the motor over a larger temperature range.

It is an advantage of embodiments of the present invention that the shape and/or size of the probe pulses can be even more optimized during each use, advantageously avoiding moving the motor one electric step or even moving the motor at all, while at the same time reducing the risk of demagnetization of the rotor.

In a embodiment, measuring the effect of the at least one first probe pulse comprises measuring a first rise time of the at least one first response pulse to reach a predefined first amplitude level, and measuring the effect of the least one second probe pulse comprises measuring a second rise time of the at least one second response pulse to reach a predefined second amplitude level, and comparing the measured effect comprises comparing the first rise time and the second rise time.

In this embodiment, the measurement is based on a "rise-time-measurement" (of a current waveform or a voltage waveform). The amplitude level is a current amplitude or a voltage amplitude.

The second amplitude level may be equal to the predefined first amplitude level in absolute value, but having an opposite sign.

The rise time is the time between the start of the response pulse (which substantially coincides with the start of the probe pulse) and the moment at which the response pulse reaches a predefined amplitude.

The rise time can be measured for example by a digital capture timer, an analog capture timer, or a combination thereof, or in any other way.

In certain embodiments of this method, the first probe pulse and the second probe pulse can have a predefined duration, irrespective of whether the first respectively second amplitude level has been reached or not. it is an advantage of such implementation that the probe pulses can be generated in a simple manner (open loop control).

In an embodiment, measuring the effect of the at least one first probe pulse comprises determining a first time period between a first moment in time at which the first response pulse reaches a first predefined amplitude level, and a second moment in time at which the first response pulse reaches a second predefined amplitude level higher than the first predefined amplitude level, and measuring the effect of the at least one second probe pulse comprises determining a second time period between a third moment in time at which the second response pulse reaches a third predefined amplitude level, and a fourth moment in time at which the second response pulse reaches a fourth predefined amplitude level higher than the third predefined amplitude level, and comparing the measured effect comprises comparing the first time period and the second time period.

Preferably the predefined third amplitude level is the same as the predefined first amplitude level in absolute value (but in case of a single-phase motor, having an opposite sign), and preferably the predefined fourth amplitude level is the same as the predefined second amplitude level in absolute value (but in case of a single-phase motor, having an opposite sign), but that is not absolutely required for the invention to work.

The first time period can be measured for example by starting a timer at the moment at which the predefined first amplitude level is reached, and stopping the timer at which the second amplitude level is reached, the timer value being representative of the time period. Starting the timer when the first amplitude level is reached has the advantage that no further processing is required, and that the absolute error on the measured time period lies in the range of 0.0 to 1.0 clock period.

Alternatively the first time period can be determined by starting the timer at any time, (e.g. at the start of the probe pulse), and a first time value can be captured at the moment at which the predefined first amplitude level is reached, and a second time value can be captured at the moment at which the predefined second amplitude level is reached, and the second timer value can then be subtracted from the first timer value. This has the advantage that the clock can continue to run (does not need asynchronous start and stop), and only a simple calculation (a single subtraction) is needed. The absolute error on the measured time period lies in the range of 0.0 to 2.0 clock periods.

In certain embodiments of this method, the first probe pulse and the second probe pulse can have a predefined duration, irrespective of whether the first respectively second amplitude level has been reached or not. it is an advantage of such implementation that the probe pulses can be generated in a simple manner (open loop control).

In an embodiment, step a) comprises stopping the first probe pulse as soon as the first response pulse has reached a predefined level, and step b) comprises stopping the second probe pulse as soon as the second response pulse has reached a predefined level.

In this method, the first probe pulse and the second probe pulse do not have a predetermined duration, but the generation of the pulse is stopped as soon as maximum allowed amplitude is reached. In this case, the generation of the probe pulse does take into account a measurement of the response pulse, in a closed loop.

Even though this method is slightly more complicated, it is a huge advantage of a closed loop control that the maximum current which will flow through the coil due to the probe pulses can be limited, and that the risk of moving the rotor and the risk of demagnetization can be further reduced. This is especially beneficial in case the amplitude of the probe pulses is not generated by a waveform generator, or a locally controlled supply voltage, or a local current source, but is largely or even completely dependent on an external supply voltage, for example a voltage coming from an AC-DC transformer.

It is a major advantage of this method that it works substantially independent of the supply voltage being used, hence, no dip-switches need to be set, or no specific software program needs to be executed, no specific settings need to be stored in memory etc. This makes the method (and the hardware performing that method) highly flexible.

In an embodiment, measuring the effect of the at least one first probe pulse comprises measuring a first peak level reached by the first response pulse, and wherein measuring the effect of the at least one second probe pulse comprises measuring a second peak level reached by the second response pulse, and comparing the measured effect comprises comparing the first current peak level and the second current peak level.

In this embodiment preferably the shape and size of the first and second probe signal is the same, but in case of a single-coil motor, with opposite sign. No time measurement is to be performed, only the maximum amplitude reached needs to be measured. This embodiment has the advantage over the rise-time-measurement that no predefined amplitude level to compare with, is required. This method may be implemented for example by using an ADC and a simple algorithm to find the maximum value, which may be simply based on comparing each measured value with the previous value.

In an embodiment, measuring the effect of the at least one first probe pulse comprises measuring a first amplitude reached by the first response pulse at a first predefined moment in time, and measuring a second amplitude level reached by the first response pulse at a second predefined moment in time, later than the first predefined moment in time, and determining a first amplitude difference as the second amplitude level minus the first amplitude level; and measuring the effect of the at least one second probe pulse comprises measuring a third amplitude reached by the second response pulse at a third predefined moment in time, and measuring a fourth amplitude level reached by the second response pulse at a fourth predefined moment in time later than the third predefined moment in time, and determining a second amplitude difference as the fourth amplitude level minus the third amplitude level; and comparing the measured effect comprises comparing the first amplitude difference and the second amplitude difference.

The first moment in time may be chosen as a predefined time interval later than the start of the first probe pulse, and the third moment in time may be chosen as a predefined time interval later than the start of the second probe pulse. In this embodiment a current difference or a voltage difference is measured as a function of a given time difference.

In any of the embodiments describe above, the same measurements may be repeated an odd number of times (for example 3 times or 5 times), and the method may comprise a further step of making a final decision about the initial rotor position based on majority voting.

In any of the embodiments describe above, step a) may be repeated multiple times and the measured effects may be combined to obtain an average first effect. Likewise step b) may be repeated multiple times and the measured effects may be combined to obtain an average second effect. And step c) may comprise comparing the average first effect and the average second effect and deriving the initial position therefrom.

In a second aspect, the present invention provides a method of starting a single-phase DC motor or a two-phase DC motor without parallel wound coils, the motor having a stator comprising magnetic material and at least one coil but less than three coils, and a rotor movably mounted with respect to the stator, the method comprising the steps of: a) determining an initial position of the rotor using the method according to the first aspect; b) energizing the rotor by applying a plurality of energizing pulses to the at least one coil, based on the determined initial position of the rotor.

It is an advantage of embodiments of the present invention that a reliable start of the motor in the correct direction can be obtained, avoiding stalling the rotor in a zero-torque position. It is a further advantage that it does not require magnetic position sensors such as Hall sensors.

In a third aspect, the present invention provides a motor drive circuit for performing the method according to the first aspect or the second aspect or both, the motor drive circuit comprising: a pulse generator unit adapted for applying at least one first probe pulse to the at least one coil for generating a first response pulse having a first direction or polarity, and for applying at least one second probe pulse to the at least one coil for generating a second response pulse having a second direction or polarity; a measurement unit for measuring an effect of the at least one first probe pulse and for measuring an effect of the at least one second probe pulse; a controller or control circuit adapted for comparing the measured effect of the at least one first probe pulse and the measured effect of the at least one second probe pulse, and for determining the initial position of the rotor with respect to the stator based on a result of the comparison.

Such motor driver can advantageously be applied to a sensorless single-coil DC motor or to a sensorless 2-coil DC motor. Such a driver does not need the use of complex algorithms or software, and the implementation may be done with simple components, such as e.g. standard transistors, switches, comparators, logic gates, counters, timers, etc. But a simple microcontroller, optionally with an embedded timer and optionally with interrupt capability and optionally with an embedded comparator and/or analog-to-digital converter (ADC), and optionally with an embedded PWM output, may also be used.

It is an advantage of embodiments which are implemented using digital technology or using a higher ratio of digital versus analog technology, because the costs of digital circuits is constantly being reduced.

The pulse generator unit may comprise or consist of a plurality of switches adapted for selectively connecting or disconnecting a set of supply rails to the coil, or may comprise or consist of one or more current sources which are enabled or disabled. Simply opening and closing the switch is sufficient for generating a rectangular pulse (using the amplitude of the voltage applied over the supply rails). The pulses may be controlled by digital control logic, for example containing a state-machine or a microcontroller.

In an embodiment, the pulse generator unit is adapted for applying a first and second probe pulse having a predefined shape and size.

In an embodiment, the pulse generator unit is adapted for selectively applying a first and second probe pulse selected from a limited number of probe pulses having a different predefined shape and size.

In an embodiment, the pulse generator unit is adapted for applying a first and second probe pulse having a first predefined shape and size, and for applying a first and second probe pulse having a second predefined shape and size different from the first shape and size, and for optionally applying a first and second probe pulse having a further predefined shape and size different from the shape and size used in a previous iteration; and wherein the motor driver further comprises means for determining a degree of non-linearity of the measured results.

In an embodiment, the motor drive circuit further comprises a current measurement unit or a voltage measurement unit for measuring a current amplitude level or a voltage amplitude level, and/or further comprises a peak current detector for measuring a current peak level or a peak voltage detector for measuring a voltage peak level, and/or further comprises a timer unit for measuring time or a time period.

In an embodiment, the timer unit optionally comprises a digital or analog capture timer, and/or, the current measurement unit and/or the voltage measurement unit and/or the peak current detector and/or the peak voltage detector comprises a shunt resistor and/or a current mirror in combination with an ADC, or a current limiting comparator, or any combination of ADC and comparators; and optionally the motor drive circuit further comprises a power stage comprising at least one transistor adapted for providing a plurality of energizing pulses to the at least one coil.

The physical component(s) to provide the probe pulses may be the same component(s) that provide "energizing pulses", or may be different components.

In a fourth aspect, the present invention provides a motor assembly comprising: a single-coil motor or a 2-coil motor without parallel windings, and a motor driver circuit according to the third aspect, connected to said motor.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 1 illustrates a typical hysteresis cycle of magnetic material of the stator of a single-phase or two-phase motor, when an exemplary current pulse is provided to a stator coil.

FIGS. 2(a)-2(c) show the magnetic flux lines in a rotor and stator for the exemplary current pulse.

FIGS. 3(a)-3(b) illustrate the measurement of the rise time as can be used in embodiments of the present invention. FIG. 3(a) shows exemplary probe voltage pulses. FIG. 3(b) shows exemplary current pulses.

FIG. 4(a) shows exemplary probe voltage pulses. FIG. 4(b) shows exemplary current pulses.

FIG. 5(a) shows exemplary probe voltage pulses. FIG. 5(b) shows exemplary current pulses.

FIGS. 6(a)-6(b) illustrate the measurement of a time period required by the first and second current to increase from a first level to a second level, as can be used in embodiments of the present invention. FIG. 6(a) shows exemplary probe voltage pulses. FIG. 6(b) shows exemplary current pulses.

Figures 4A, 4B:
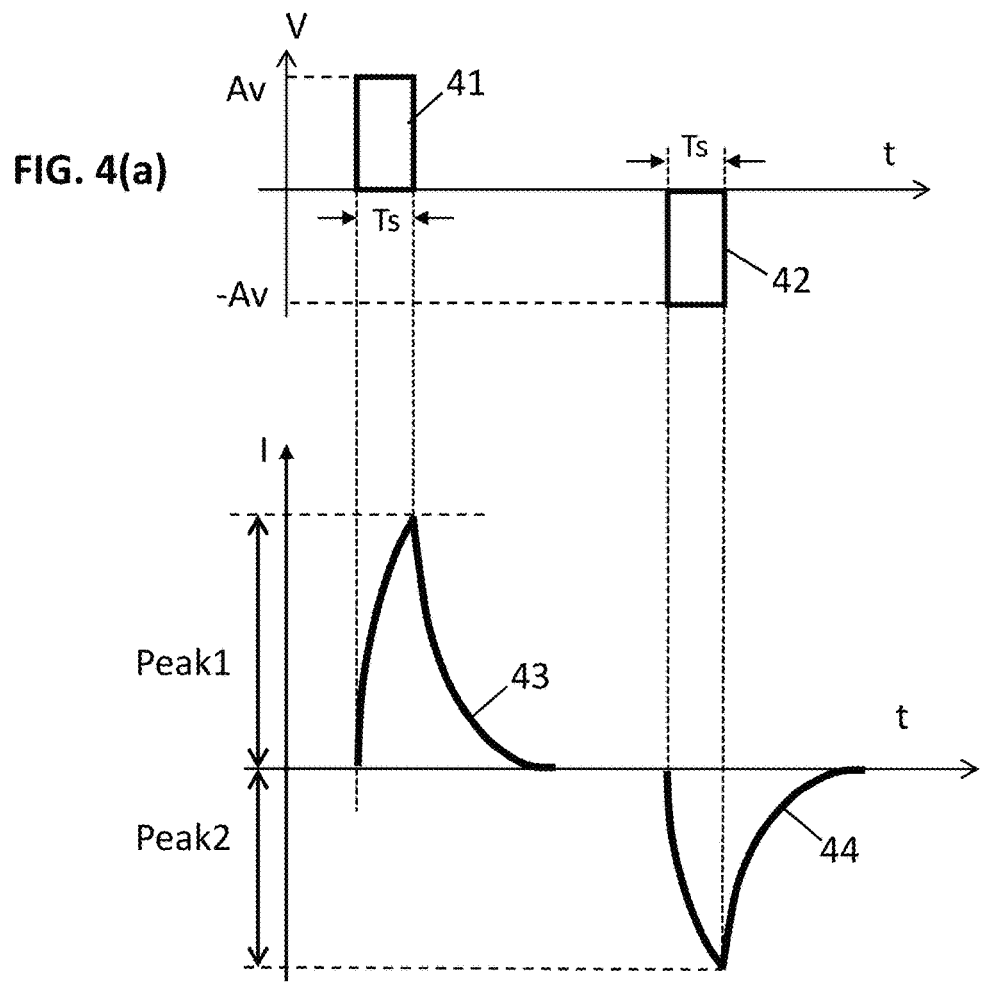
FIGS. 4(a)-4(b) illustrate the measurement of current peak amplitude as can be used in embodiments of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to "probe pulse" or "probe signal", reference is made to a pulse signal, e.g. a substantially rectangular pulse having a certain amplitude and duration, which does not "power-up" the motor or at least does not switch the motor one electric step, but which changes some of its characteristics in a measurable way. Hence, "probe pulses" are different from "energizing pulses" in that probe pulses substantially do not move the rotor, or move the rotor less than necessary to switch one electric step.

In the framework of the present invention, a probe pulse can be either a probe voltage pulse or a probe current pulse, and the resulting response pulse can either be a current pulse or a voltage pulse respectively.

With "peak current" or "peak level" is meant the maximum amplitude reached by a current pulse or a voltage pulse.

Where in embodiments of the present invention reference is made to "rise time", reference is made to the time a magnitude takes to reach a given amplitude value, also referred to as "threshold value". For example, reference will be made to "current rise time" as the time the current pulses need to reach a predetermined current amplitude value (e.g. a value for which the stator is in a predetermined level of saturation).

Where the present invention mentions "opposite sign", this is actually only true for a single coil motor. For a motor with two coils, the coils are typically oriented 90° apart, and depending on how the voltage pulses are applied, they may have the same or opposite polarity.

In this document the expression "two-phase DC motor without parallel wound coils" and "two-phase DC motor having two coils wound on alternating stator poles" mean the same.

For ease of explanation, the principles of the present invention will be explained for single-phase fans, however a similar approach can be applied on two-phase or 2-coil motors with a low coupling coefficient between the two-phase coils, for instance where the coils are wound on separate stator shoe poles, and not parallel wound. Some examples will be discussed for 2-coil motors. For ease of explanation, the detailed examples described herein are give for probe voltage pulses causing current pulses to flow in the stator coil, which current can be measured, and in some embodiments, the current pulse is used to shape the probe pulse, e.g. to truncate the probe pulse, but the invention is not limited thereto, and it the invention also works if probe current pulses are applied, generating voltage pulses having waveforms which can be measured, and which may cause the current pulses to stop.

The inventors of the present invention were confronted with the problem of reducing the system cost of a fan motor for the 1-coil or 2-coil motor described above, but with the constraint that the motor still has to reliably start-up in the correct direction. In particular the cost of the electronics of the fan motor, including the driver circuit and any sensors but excluding the motor itself.

Despite the common believe that the driver circuit of a 1-coil or 2-coil motor simply cannot work without a sensor, at least not in a sufficiently reliable manner as required by the automotive, Consumer Electronics and the Computer industry, they decided to perform experiments without a sensor, and to try to determine the motor position by applying voltage pulses to the coil(s), and by measuring their effect of the resulting current pulses, and whether it would be possible to determine the rotor position with sufficient accuracy.

In the field of three-phase motors US2001045812(A1) describes a method for determining an initial position, but it is known in the field that this method does not always provide the correct result, and therefore it is seldomly applied.

Nevertheless, the inventors were able to find techniques which work surprisingly well for the 1-coil or 2-coil motor described above, even under largely varying operating conditions (supply voltage, temperature, etc.)

In a first aspect, the present invention provides a method of determining an initial position of a single-phase DC motor, or of a two-phase DC motor without parallel wound coils, the motor having a stator comprising magnetic material and at least one but less than three coils, and a rotor movably mounted with respect to the stator.

The method comprising the following steps:
  (a) applying at least one first probe (voltage or current) pulse 31, 41, 51, 61 to the at least one coil thereby generating a first response (current or voltage) pulse 33,

43, 53, 63 having a first direction or polarity, and measuring an effect (for example: rise-time, peak-amplitude, time-difference to reach a given current difference, current difference resulting from a given time difference) of the at least one first probe (voltage or current) pulse. The effect may be related to magnetic saturation of the stator, (b) applying at least one second probe (voltage or current) pulse 32, 42, 52, 62 to the at least one coil thereby generating a second response (current or voltage) pulse 34, 44, 54, 64 having a second current direction or voltage polarity, and measuring an effect (for example: rise-time, peak-amplitude, time-difference to reach a given current difference, current difference resulting from a given time difference) of the at least one second response pulse. The effect may be related to magnetic saturation of the stator, (c) determining the initial position of the rotor with respect to the stator by comparing the measured effect of the at least one first probe (voltage or current) pulse and the measured effect of the at least one second probe (voltage or current) pulse.

It is noted that for the envisioned kind of 1-coil and 2-coil motors, not just any random angular position needs to be determined, but the motor can only be in one of two predefined conditions (assuming the motor did not stop in a zero-torque position). For example, referring to FIG. 14, the rotor pole "in front of" the coil A can either be North or South. Once it is clear which rotor pole is located in front of coil(s) A, it is also known which rotor pole is in front of coil(s) B, and the motor can be started in a reliable manner, by providing energizing pulses.

The at least one first and the at least one second probe (voltage or current) pulse have a shape and size (and thus intensity or energy content) sufficiently small for not substantially moving the rotor relative to the stator, and have a shape and size (and thus intensity or energy content) sufficiently large such to cause at least partial saturation of the magnetic stator material.

These probe pulses are generally provided when the motor is static (standing still). Each probe voltage pulse is directly linked to a current pulse with a predetermined direction in the coil. The probe pulses are preferably chosen so that at least one of the probe pulses (the first or the second) affects the magnetic characteristics of the stator.

In a first embodiment only a single first probe voltage pulse PA is provided to cause a single first current pulse IA to flow in a first direction in the coil, and only a single second probe voltage pulse PB is provided to cause a single second current pulse D3 to flow in a second direction in the coil. The probe voltage pulse PA may cause the corresponding current pulse IA to drive the stator to saturation or close to saturation, while the probe pulse PB may cause the corresponding current pulse D3 to have a smaller effect on the saturation of the stator. Once it is determined which of the two probe pulses PA or PB or which of the two current pulses IA or D3 had the largest effect on bringing the stator at least partially in saturation, the determination of the position of the rotor with respect to the stator is obtained.

In case of a two-coil DC motor, a probe pulse PA may be applied to one coil and the probe pulse PB may be applied to the other coil, where the probe pulses PA and PB are chosen such that their effect on the pole saturation is sufficiently distinguishable.

The two probe pulses PA and PB are further adapted such that they do not substantially move the rotor with respect to the stator. This means that the probe pulses do not cause the rotor to make an electric step, and preferably they avoid the rotor to be stuck in the zero torque position. For example, the pulse does not energize the motor or even substantially move the rotor with respect to the stator. To achieve this, in embodiments of the present invention, the probe pulses have a suitable shape and size. For example, the probe pulses may have a substantially rectangular shape, (i.e. have a substantially constant voltage amplitude during their full duration, apart from e.g. some voltage ripple as typically occurs with regulated power supplies or due to rectification of an AC-voltage), but other shapes may also be used, such as for example a triangular shape or a trapezoidal shape. For keeping the description simple, the invention will be further explained for rectangular pulses, more in particular voltage pulses obtained by switching a supply voltage. Rectangular probe voltage pulses have an amplitude and a duration. The larger the amplitude and the larger the pulse duration, the larger the intensity and energy content of the pulse.

In order to create, e.g. induce a current pulse having an amplitude sufficiently large to cause at least partial saturation of the magnetic material, the amplitude or duration or both of the voltage probe pulse must be sufficiently large. However, if the amplitude and/or duration is too large, the risk of moving the rotor is increased, and also the risk of demagnetization is increased. Therefore, a delicate tradeoff needs to be made to provide probe pulses with an amplitude and with a pulse duration sufficiently large, but not too large.

In particular embodiments of the present invention, the probe pulses have a predefined fixed amplitude and a predefined fixed duration. For a given motor design, the skilled person can find a suitable pulse amplitude and a suitable pulse duration by performing routine tests. The maximum allowed amplitude and/or maximum allowed duration of a probe pulse which does not energize the motor may be obtained by calculations taking into account the rotor inertia, by design, by calibration, by simulations, by experimentation, or by mere trial and error.

An aspect which may be taken into account is that certain motors (such as e.g. ferrite motors) are sensitive to demagnetization. Hence for this kind of motors a current pulse with a relatively high amplitude would be undesirable. However, it is contemplated that for each type of motor a suitable probe pulse shape and size can be found.

This technique provides a very satisfactory solution for relatively large series of a single type of motor, and for a relatively small temperature range (e.g. from 0° C. to 70° C.) and for a given voltage supply range (e.g. from 10 V to 14V).

But the inventors went one step further, and found ways to increase the reliability, and/or to make the method and motor driver circuit more flexible or more generic, so that it can be used for a larger temperature range and/or for a larger voltage range and/or for a larger series of motors, and preferably two of these, and most preferably all of these.

One way to improve the results, e.g. to increase the accuracy or reliability is to perform the same measurement multiple times, and applying majority voting (in case of a binary outcome, as is the case here).

Another way to improve the results, e.g. to increase the accuracy or reliability is to not use a single pulse amplitude and duration, but to vary the amplitude and/or duration as a function of for example temperature. For example, the electrical resistance of the coil as a function of temperature, or demagnetization as a function of temperature may be taken into account, and the pulse shape and/or size may be corrected based on such variations. For example multiple voltage pulses could be applied. The motor coil resistance could be used as an indication of ambient temperature of the rotor.

For example, in such embodiments, the method would first determine a temperature, or a physical value which is dependent on temperature (e.g. a resistance value or a forward voltage value, etc), and depending on the temperature, one of a predefined set of suitable probe pulses is selected (for example hardcoded or using a look-up table, or in any other way). The set of suitable probe pulses can be found in a similar manner as described above, by design, by simulation, or by experiments under different temperature conditions, or combinations of these. It is noted in this respect that even a set of only two or only three different probe pulses may have a large impact on reducing the risk of demagnetization and on the probability of false position detection, especially for applications having to operate under a relatively large temperature range.

Instead of measuring a temperature, it would also be possible to read a selection parameter, such as an index, from a non-volatile memory (e.g. flash of a microcontroller). The selection parameter may be stored in the non-volatile memory during production, for example after some measurements in an End-Of-Line test (EOL).

Desiring to further improve the method, the inventors came to the idea of not selecting the most appropriate probe pulse size beforehand (e.g. at design time), but to find the most appropriate pulse during actual use of the device, by starting with a relatively small probe pulse, and gradually increasing its amplitude and/or pulse duration such that the condition of at least partial saturation is satisfied.

This method of dynamically finding a suitable probe pulse size is further referred to herein as "scanning method". In one implementation, both the pulse amplitude and the pulse duration are dynamically determined. In another implementation, the pulse duration is kept fixed, and only the probe pulse amplitude is dynamically adjusted.

Because demagnetization and sensitivity may depend on external circumstances, such as temperature, a scan could be performed before each utilization of the motor. The scan may be implemented using relatively coarse steps, or using relatively fine steps. It is a major advantage of this method that at same time the risk of demagnetizing the stator, as well as the risk of false position detection, as well as the risk of causing the rotor to move, can be reduced or even eliminated.

As will be described further, the direct effect of the first/second probe voltage pulse is the creation of a first/second current pulse in the coil. Even though the first probe voltage pulse and the second probe voltage pulse are identical in shape (e.g. both rectangular) and size (i.e. same amplitude and same duration), the first current pulse and the second current pulse are not identical in shape and size. Indeed, the shape and size of the first and second current pulse depends on the relative position of the stator and the rotor, and the difference is especially pronounced when one current pulse drives the stator in saturation, while the other current pulse does not. A difference between the first and second current pulse can be measured in several ways, for example by measuring a rise-time (i.e. the time between the start of the pulse and the time to reach a predefined amplitude), or by measuring the time required for each pulse to reach its peak level, or by measuring the amplitude reached after a given time, etc. It is an advantage that these measurements do not require a Hall sensor for measuring magnetic properties directly, although that would also be possible.

Apart from applying voltage pulses with a certain shape and duration, different characteristics of the current pulses can be measured, as will be described further. It is explicitly contemplated that each of the pulses described above (single pulse, multiple pulses, pulses taking into account temperature, series of growing pulses) can be combined with different measurements (rise-time, current-difference, time-period) as will be described next.

Referring now to the figures.

FIG. 1 shows the schematic B-H curve of an exemplary stator of a single-phase motor. Stators for single-phase motors usually comprise soft magnetic materials, thus the cycle can be simplified to a line. The initial situation 101 of the stator shows the field produced by the presence of the magnetic field in the rotor (due to the presence of a permanent magnet). A first probe voltage pulse will induce a first current pulse with maximum amplitude corresponding to arrow 102, which will drive the stator to saturation in working point 103, and a high field B (a high magnetic flux) will be present in the stator. After the first probe pulse is removed, the induced first current decays, and the field returns following the path 104 on the BH curve to the point corresponding to the initial situation in working point 101. When a second probe voltage pulse is applied, a second current pulse with a direction opposite the first direction, and with a maximum amplitude corresponding to arrow 105 is induced. This second current pulse will drive the stator to point 106 on the BH-curve, which in this example does not reach saturation, but results in a magnetic flux lower than that of point working point 103. This asymmetric behavior is measurable, and can easily be obtained by simply applying or inducing two known probe voltage pulses (of the same amplitude and duration) in the coil, at different moments in time.

It is noted that the above is a simplified explanation merely to illustrate the principle of operation of the invention. The inventors do not wish to be bound by any theory or by this example. For instance, other steps may be included. For example, a train of pulses of increasing amplitude may be applied, for scanning an appropriate amplitude (such that saturation may be reached, without producing an electrical step in the motor or to move the motor, and without demagnetizing the ferrite) or for obtaining a plurality of results so that a majority voting can be applied, etc.

FIG. 2 shows an exemplary embodiment of the effect of a first and second probe voltage pulse on the magnetic flux of the stator, for an exemplary position of the rotor.

FIG. 2(a) shows a motor in standstill 200, comprising a permanent magnet as a rotor 201, and a stator 202, preferably having "asymmetric teeth", but the present invention is not limited to a stator with asymmetric teeth, with stator shoes 203, whose poles 204 have coils 205 for powering the rotor. The arrow 206 shows the direction of the magnetic field of the rotor 201. With reference to FIG. 1, this situation corresponds to the initial situation 101. In principle, the direction of the magnetic field 206 is unknown, and only by comparison of the responses to the first and second induced magnetic fields it is possible to obtain the sought information.

FIG. 2(b) shows the situation when a first probe voltage pulse is applied, and causes a first current pulse to flow through the coils 215 in a given direction shown in the drawing (by means of "X" for current entering the plane of the drawing, and a "dot" for current exiting the plane of the drawing). The first probe pulse creates an extra field 216 which, in the present example, reinforces the magnetic field 206 already present in the stator shoes due to the rotor 201. In the example, this second current pulse saturates the stator. This situation corresponds to the working point 103 (saturation) in FIG. 1. The probe pulse is sufficiently short such that it does not move the rotor. The effect of the first probe pulse is measured. For example, the total flux can be measured, or the inductance, or the degree of saturation, or another magnitude. In preferred embodiments however, none of these values is measured directly, but instead a time or current amplitude is measured instead.

FIG. 2(c) shows the situation when a second probe pulse is applied, which causes a second current pulse to flow through the coils 225 in a direction opposite the direction of the first current pulse. The second current pulse creates a magnetic field 226, oriented in a direction opposite to the magnetic field 216 shown in FIG. 2(b). The situation of FIG. 2(c) corresponds to working point 106 of FIG. 1, and an effect of the second probe pulse is measured.

Then the measured result corresponding to the first probe pulse is compared with the measured result corresponding to the second probe pulse. This gives information regarding the position of the rotor with respect to the stator.

FIG. 3 illustrates an embodiment of the present invention wherein a first probe voltage pulse 31 is applied to the coil, inducing a first current pulse 33. The time Tr1 for the first current pulse 33 to reach a predefined amplitude "A1" is measured. Some time later, a second probe voltage pulse 32 is applied to the coil (or to the second coil), resulting in a second current pulse 34. The time Tr2 for the second current pulse 34 to reach a predefined amplitude "−A1" is measured. Then Tr1 and Tr2 are compared, and based on the outcome, the position of the rotor is known. In the example shown, the first and second probe voltage pulse 31, 32 have the same amplitude A1 and the same duration Ts, but opposite sign, but it would also be possible to use pulses with a different amplitude and/or a different duration.

FIG. 4 illustrates another embodiment of the present invention wherein a first probe voltage pulse 41 is applied to the coil (or to the first coil), inducing a first current pulse 43. The first current pulse 43 reaches its maximum amplitude at the moment when the first voltage pulse 41 stops. This first peak amplitude "Peak1" is measured. Some time later, a second probe voltage pulse 42 is applied to the coil (or to the second coil), resulting in a second current pulse 44. The second current pulse 44 reaches its maximum amplitude at the moment when the second voltage pulse 42 stops. This second peak amplitude "Peak2" is measured. Then the peak amplitudes Peak1 and Peak2 are compared, and based on the outcome, the position of the rotor is known. In the example shown, the first and second probe voltage pulses 41, 42 have the same amplitude and the same duration, but have an opposite sign.

These examples are further explained with reference to the flowcharts of FIG. 7 and FIG. 8. Other possibilities include applying an additional train of pulses for tuning the appropriate peak level. For example, a scanning can be performed at each start-up, before each actual use of the motor, for determining which peak level to use. Also, instead of a single measurement, a plurality of measurements may be done, obtaining the result by majority voting.

A combination of different principles is also possible, e.g. the principle of FIG. 3 where the rise-times are measured and the principle of FIG. 4 where the peak-currents are measured may also be applied, and majority voting may be used for obtain a final decision.

Figure 5A:
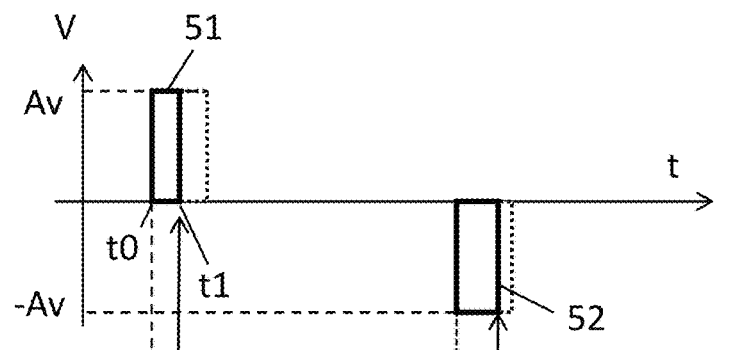
FIGS. 5(a)-5(b) illustrate a variant of the pulses used in FIG. 3, where the duration of the probe voltage pulses depends on characteristic of the resulting currents.
Figure 5B:
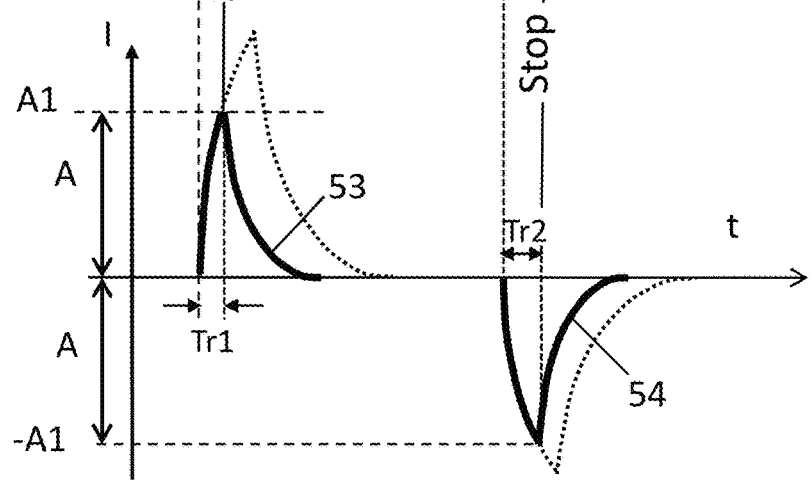

FIG. 5 illustrates a variant of the pulses used in FIG. 3, where the duration of the probe voltage pulses 51, 52 depends on characteristic of the resulting current pulses 53, 54. More in particular. At time t0 a first voltage pulse 51 is applied, causing a current pulse 53. When the current pulse 53 has reached a predefined amplitude A1, the voltage pulse 51 stops, hence the current 53 will not further increase, thus the risk of demagnetization is reduced. The time t1 minus t0 is the rise-time Tr1. If the pulse amplitude is the same as in FIG. 3, the same rise-time Tr1 will be measured. The second rise-time is measured in a similar manner, but stopping the second pulse 52 when the second current 54 reaches a predefined amplitude −A1. This functionality can be implemented by using a "current limiter", an example of which will be shown in FIG. 15 to FIG. 17.

FIG. 6 illustrates the measurement of a time period ΔT1 required by the first current 63 to increase from a first level A1 to a second level A2, and the time period ΔT2 needed by the second current 64 to increase (in absolute value) from a first level A1 to a second level A2, but having opposite sign. The position of the rotor is then determined by comparison of ΔT1 and ΔT2.

Thus, the measurement principle of FIG. 6 is based on choosing a first and second current amplitude, and to measure the corresponding time-period.

In a variant (not shown) of the embodiment shown in FIG. 6, a first and second time are chosen, and a difference in current amplitude is measured.

Figure 7:
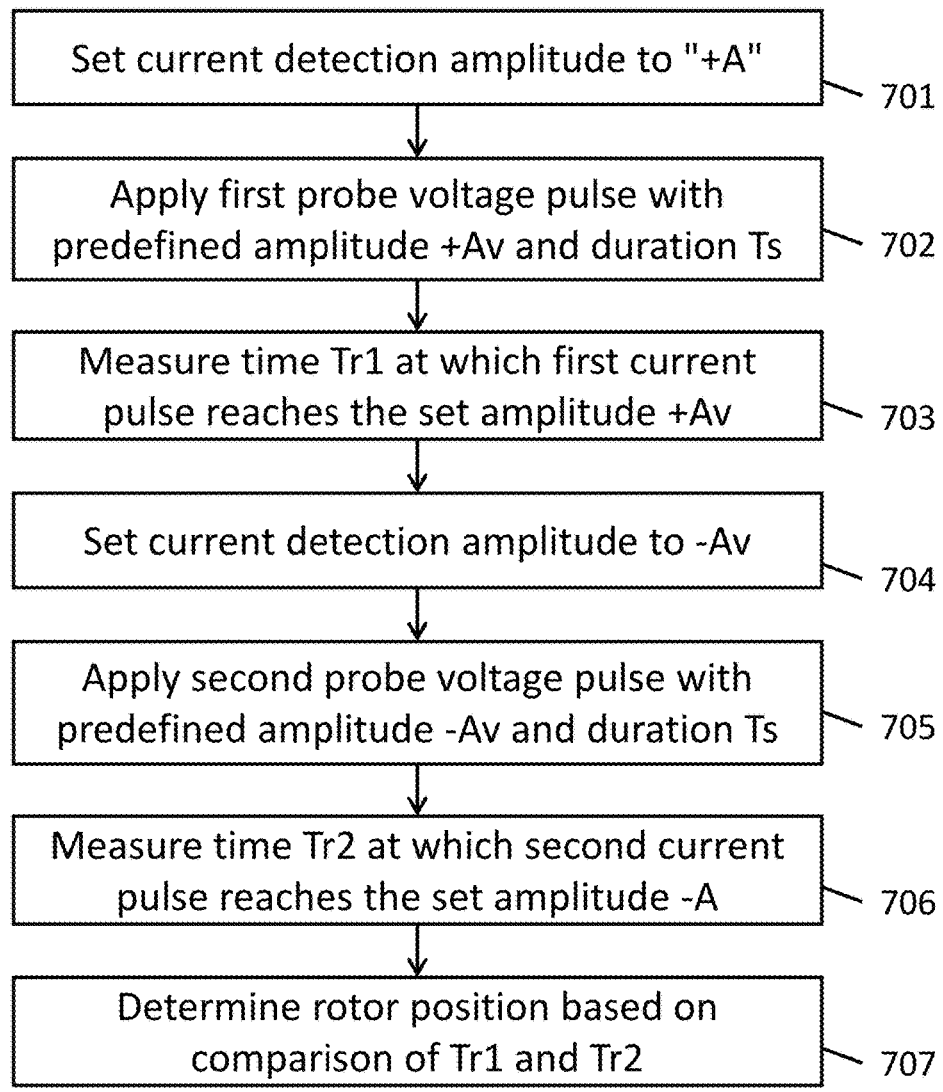
FIG. 7 shows a method according to the present invention for performing the measurement illustrated in FIG. 3.

FIG. 7 shows a flow-chart of a possible implementation for obtaining the measurements corresponding to FIG. 3, in which both voltage probe pulses 31, 32 are pulses with a known predetermined amplitude Av and pulse duration Ts but the pulses have opposite sign. The current amplitude value "A1" may be defined by a current limiting function, for example using a comparator, or using a scanning ADC, etc.

The exemplary method comprises step 701 of setting a current detection threshold to value "A1". In step 702 a first voltage probe pulse 31 is applied to the coil. In step 703 the time Tr1 required for the first current 33 to reach amplitude A1 is measured, for example by capturing the timer value when the set threshold amplitude is reached. This can be implemented for instance using a digital capture timer, an analog capture timer, or a combination thereof, or by a timer and an analog to digital converter (ADC).

In step 704 a second current threshold (equal to "−A1") is set, and in step 705 a second probe voltage pulse 32 is applied. The second probe voltage pulse 32 is identical to the first probe voltage pulse 21, except that it has an opposite sign. In step 706 the time Tr2 for the second current pulse 34 to reach the amplitude value "−A2" is measured.

Finally, in step 707, the values Tr1 and Tr2 are compared, for example using a comparator, and the initial position of the rotor is derived depending on the outcome of the comparison.

Figure 8:
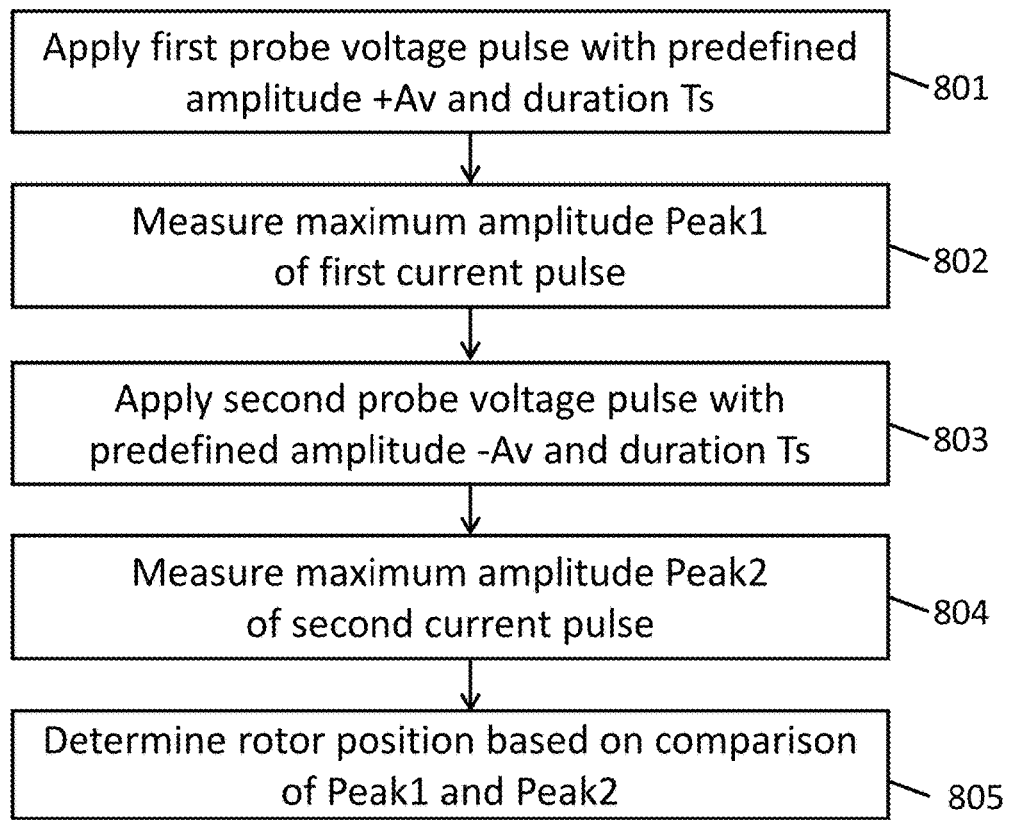
FIG. 8 shows a method according to the present invention for performing the measurement illustrated in FIG. 4.

FIG. 8 shows a flow-chart of a possible implementation for performing the measurements corresponding to FIG. 4.

In step 801 a first probe voltage pulse 41 is applied, causing a first current pulse 43 to flow in the coil. As shown in FIG. 4, an amplitude of the first current pulse will first monotonically increase, and then monotonically decrease. An analog or digital hardware circuit, for example comprising a state-machine or a microcontroller will measure the peak amplitude "Peak1" of the first current 43 in step 802.

In step 803 the second probe voltage pulse 42 is applied, causing a second current pulse 44 to flow in the coil. In a similar way as described in step 802, the hardware will determine the maximum current amplitude value "Peak2" of the second pulse 44.

In step 805, the values Peak1 and Peak2 are compared, and depending on the result of the comparison, the position of the rotor is determined.

Figure 9:
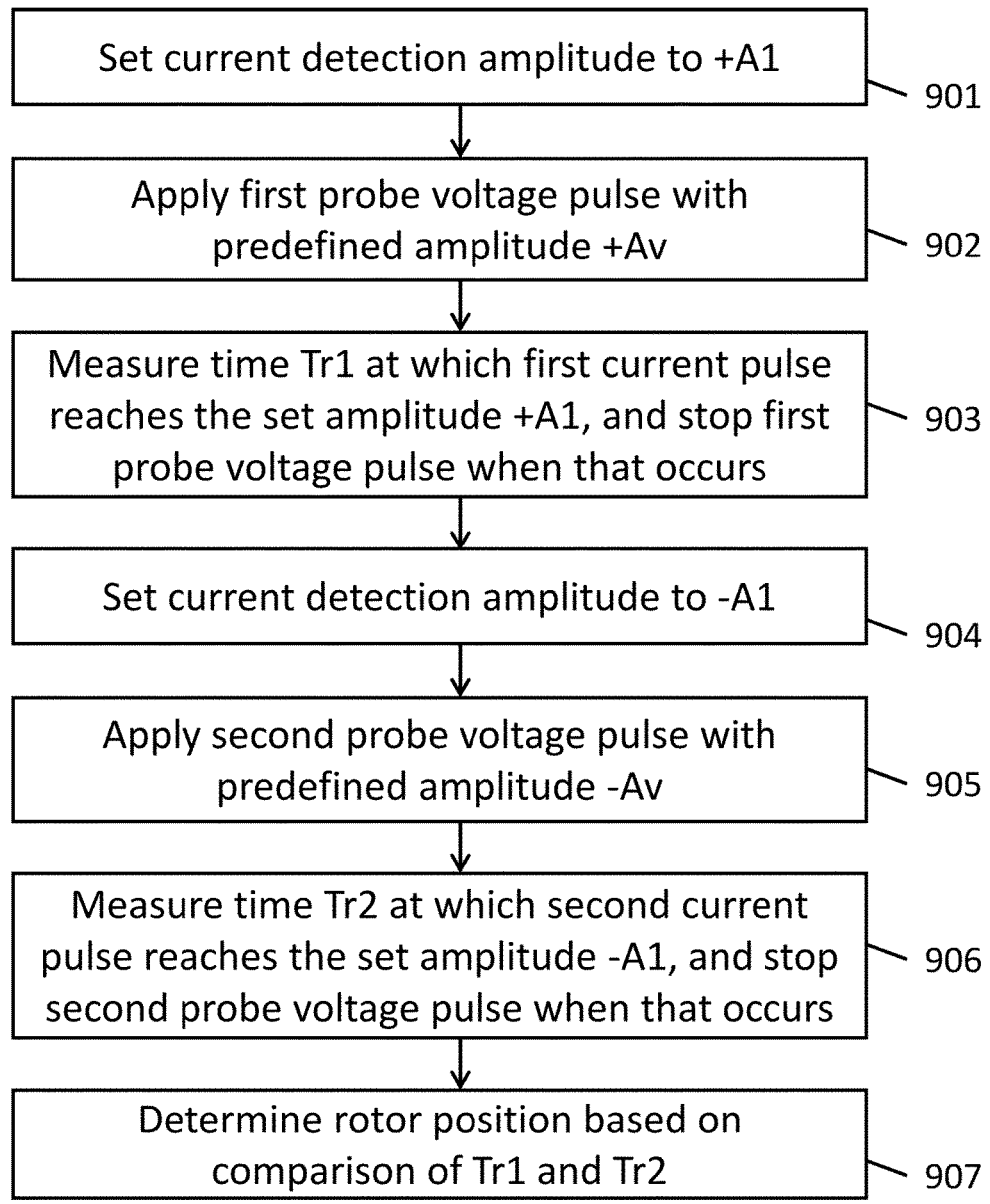
FIG. 9 shows a method according to the present invention for performing the measurement illustrated in FIG. 5.

FIG. 9 shows a flow-chart of a possible implementation for performing the measurements corresponding to FIG. 5.

In step 901 a current detector is configured to detect amplitude "A1".

In step 902 a first probe voltage pulse 51 is applied, causing a first current pulse 53 to flow in the coil. As shown in FIG. 5, an amplitude of the first current pulse will monotonically increase. A hardware circuit measures the time Tr1 needed for the first current to reach the value A1, in step 903, but in addition, also provides a signal to the sub-circuit that generates the voltage probe pulse 51, to indicate that the first voltage pulse should stop. If the first voltage pulse is implemented by means of a switch connected between the coil and a supply rail, this means that the switch can be opened. The result is that the amplitude of the first current will not further increase.

In step 904 a current detector is configured to detect amplitude "−A1".

In step 905 a second probe voltage pulse 52 is applied, causing a second current pulse 54 to flow in the coil. As shown in FIG. 5, an amplitude of the second current pulse will monotonically increase (in absolute value). A hardware circuit measures the time Tr2 needed for the second current to reach the value −A1, in step 906, but in addition, also provides a signal to the sub-circuit that generates the second voltage probe pulse 52, to indicate that the second voltage pulse should stop. The result is that the amplitude of the second current will not further increase.

Figure 10:
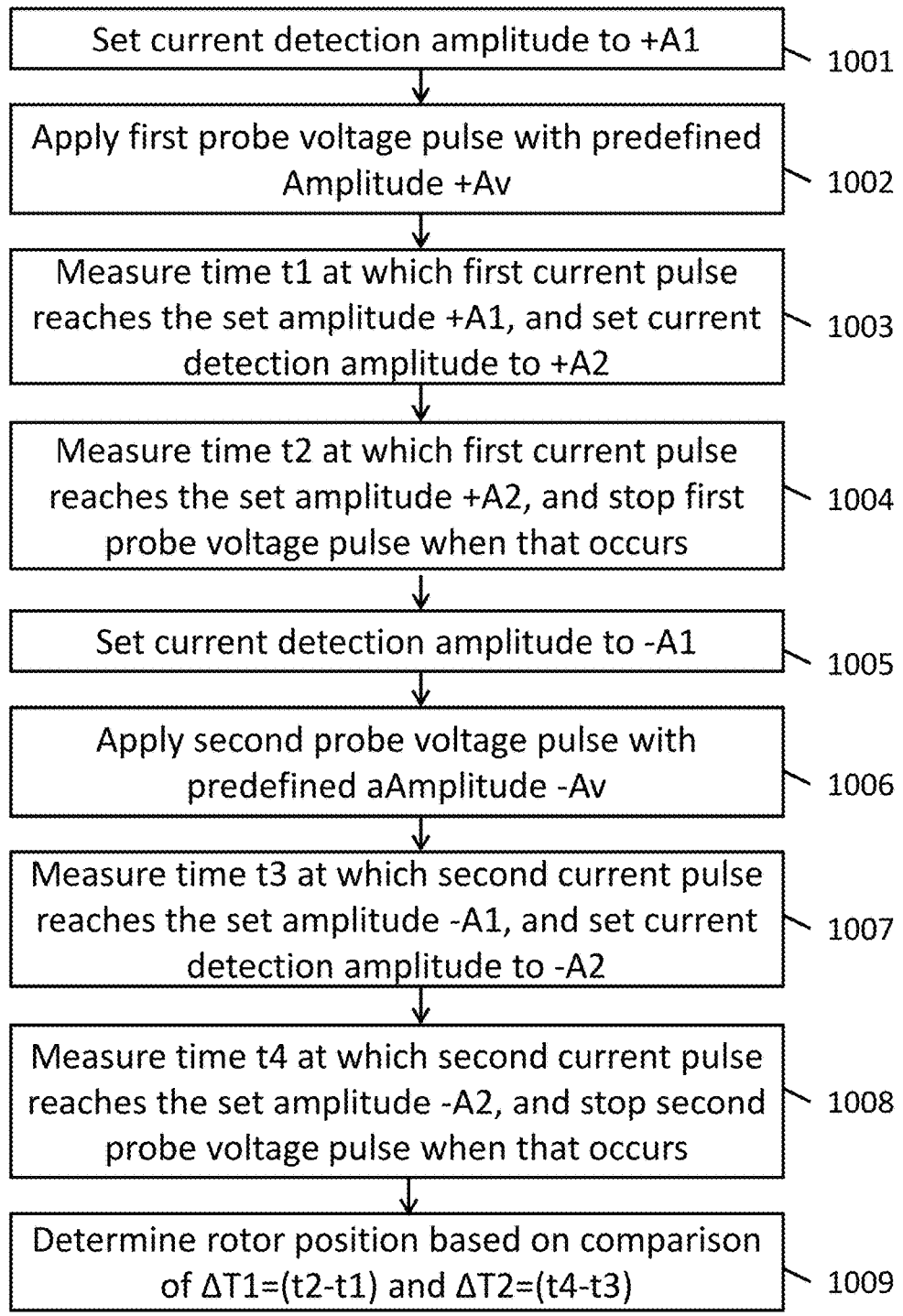
FIG. 10 shows a method according to the present invention for performing the measurement illustrated in FIG. 6.

FIG. 10 shows a flow-chart of a possible implementation for performing the measurements corresponding to FIG. 6.

In step 1001 a current detector is configured for detecting an amplitude level "+A1".

In step 1002, a first probe voltage pulse 61 is applied, having a predefined amplitude Av (e.g. the voltage provided by a voltage rail, or by a battery, or by a power supply). This will cause a first current pulse 63 to start flowing in the coil.

In step 1003 the time t1 is measured at which the first current reaches the value +A1. The time is stored, and the current detector is configured for detecting an amplitude level +A2, larger than A1.

In step 1004 the time t2 is captured as which the first current pulse reaches the level A2, and a stop-signal is sent to the sub-circuit that generates the first voltage pulse.

In step 1005 to 1008 similar steps are applied for the second voltage pulse, yielding time t3 and t4 at which the second current reached amplitude level −A1 and −A2 respectively.

In step 1009, the time difference $\Delta T1=T2-T1$ and $\Delta T2=T4-T3$ is determined, and the values $\Delta T1$ and $\Delta T2$ are compared, and based on the result of the comparison, the motor position is determined.

In a variant of this method, the timer is started at T1, and the stopped at time T2. This offers the advantage of not having to subtract two time-values. Likewise, the timer would be started at time t3, and stopped at time T4.

FIG. 11 shows an example of a motor assembly 1100 comprising a motor and a drive circuit. The motor comprises a rotor 1101 surrounding a stator 1102. The stator 1102 comprises four shoes 1103 (which may be asymmetrical) with corresponding coils 1105. The arrows 1106 show the direction of the magnetic field of the rotor 1101.

A controller 1107 (for example, a microcontroller) controls the transistors of a driver stage. A sensor 1108 (e.g. a current sensor) may obtain measurements (e.g. current measurements, etc) in the coil, and is connected to the controller for providing the sensed signal. If the sensor 1108 is a current sensor, it may comprise a shunt resistor or a sense fet in combination with an ADC, a current limiting comparators, or any combination of ADC and comparators. In the schematics shown, the shunt resistor is shown in series with the coil, but that is not the preferred position. In variants of the schematics, the shunt resistor 1108 is located between the driver transistors 1122, 1124 and ground, or above the driver transistors 1121 or 1123 and the supply voltage VDD.

Application of the probe voltage pulses having a shape and size, for example applying rectangular pulses having a predefined or configurable amplitude and having a predefined or configure pulse duration, and measurements of rise time and/or measurements of current amplitude levels or current peak levels, may be performed using digital or analog circuitry, for example comprising one or more analog-to-digital convertor (ADC), one or more digital-to-analog convertor (DAC), one or more comparator, one or more digital or analog capture timers, and any combination hereof. The motor driver is adapted for connecting a power source 1109 (for example a voltage supply) to the coils 1105 located around the poles 1104.

Figure 11A:
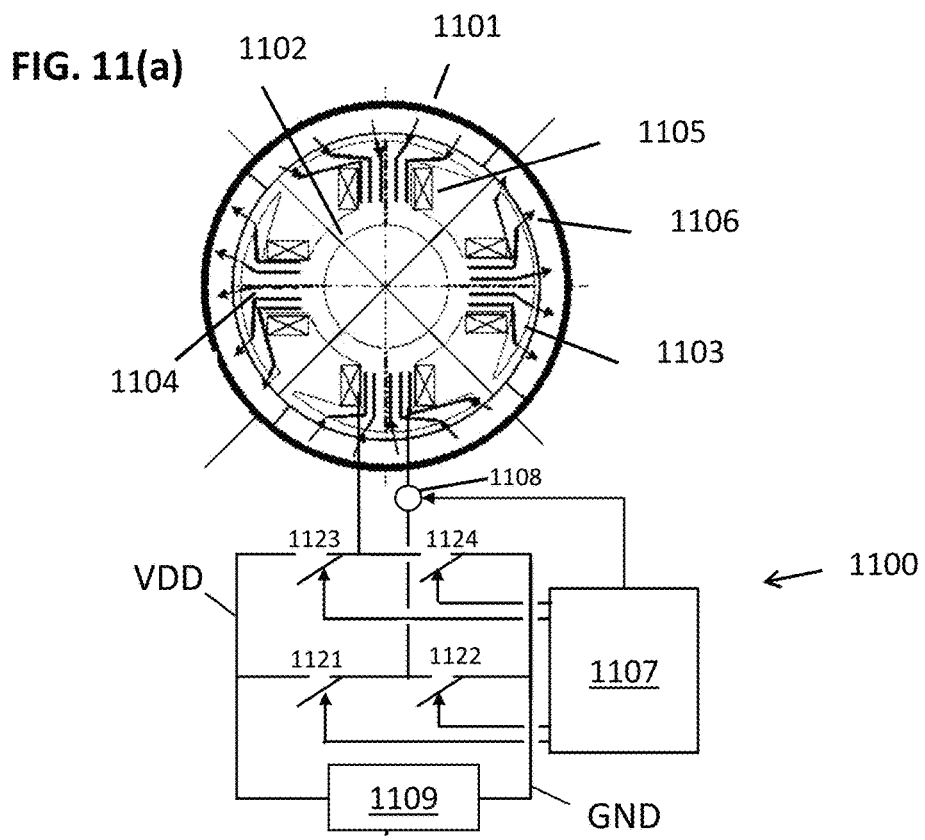
FIGS. 11(a)-11(c) show an example of magnetic flux lines in a rotor and stator for two probe voltage pulses, and an exemplary driving circuit, in accordance with embodiments of the present invention.

In FIG. 11(a) the magnetic field lines are shown when no current is applied.

Figures 11B, 11C:
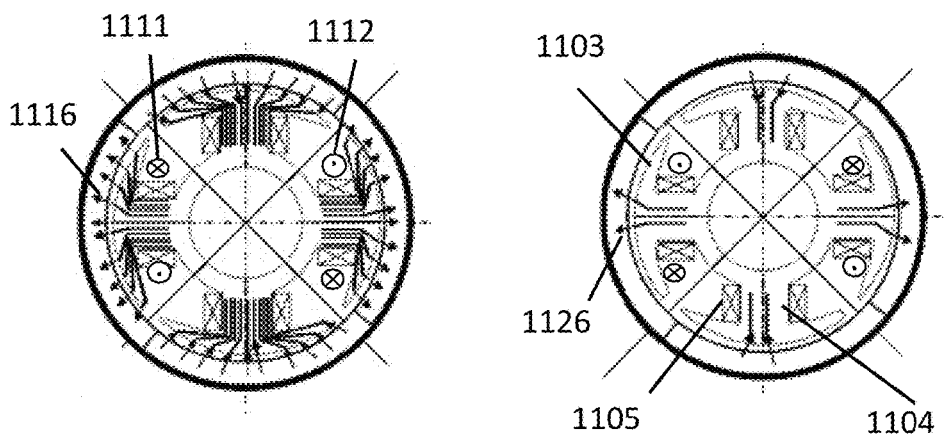

FIG. 11(b) shows the distribution of the magnetic field 1116 when the current pulse flowing through the coils 1106 reinforces the magnetic field of the rotor (as shown by the encircled "X" 1111 and encircled "point" 1112, showing current entering and exiting the plane of the drawing, respectively). If the amplitude of the current pulse is sufficiently high, the stator core will be close to or in saturation, and for example its self-inductance will appear to be lower, which can be measured.

FIG. 11(c) shows the distribution of the magnetic field 1126 when the current pulse flowing through the coil counteracts, e.g. cancels the magnetic field lines of the rotor. In this case, the stator core will not be in saturation.

The driver may be applied to any motor with stator susceptible to saturation, and to any suitable configuration.

FIG. 12 shows the principle of an exemplary embodiment of a motor assembly comprising a motor and a motor driver circuit 1200. The motor comprises a 2-coil configuration with no parallel wound coils, which may have the advantage of inexpensive manufacture. A switching system (for example, switches 1201, 1202 such as transistors connected to a controller 1207) controls the sequential energizing of the coils 1203, 1204 wound in their respective poles. The present invention can be applied to such configuration.

Figure 12A:
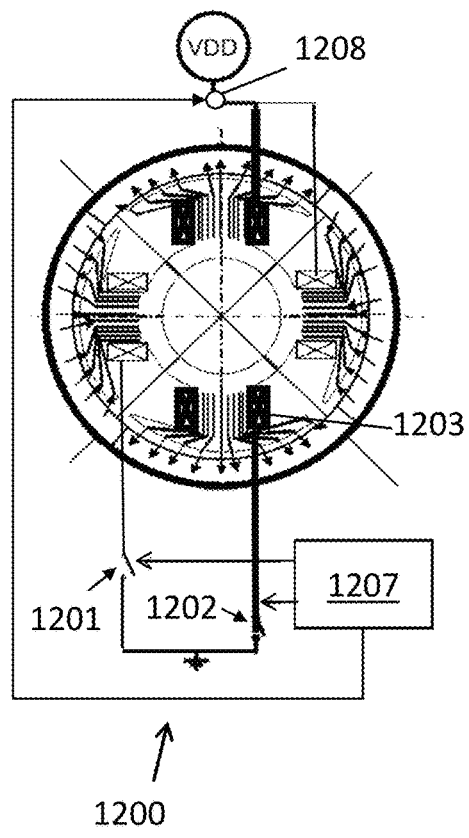
FIGS. 12(a)-12(b) show two modes of operation according to embodiments of the present invention for a 2-coil DC motor, with no parallel winding.
Figure 12B:
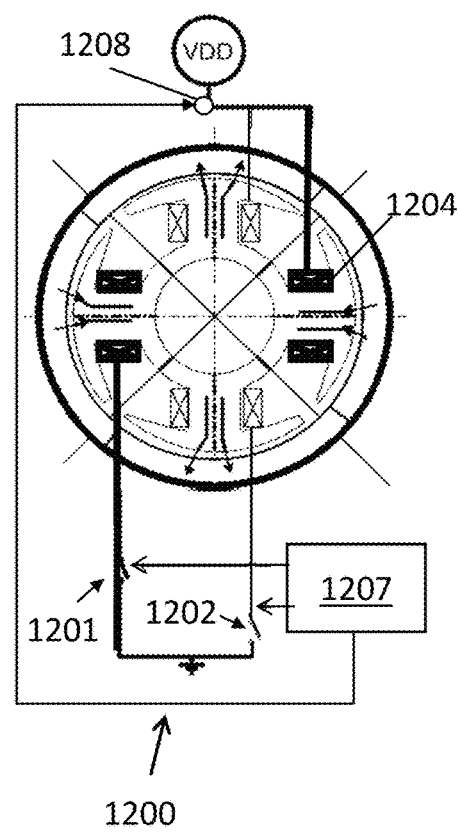

The controller 1207 may be adapted to control the switches to sequentially provide each of the coils 1203, 1204 with a short duration voltage pulse for inducing coil currents, with an amplitude and a duration such that magnetic pole saturation will be reached or almost be reached as a result of the magnetic field caused by one of said current pulses, but without energizing the motor as already explained above. In the configuration of FIG. 12(a) the switch 1202 is closed, hence the coils 1203 are powered. In the configuration of FIG. 12(b) the controller opens the switch 1202 and closes the switch 1201, hence the coils 1204 are powered. and a single sensor 1208 (e.g. a shunt sensor) may be used to obtain measurements in either of the coils 1203, 1204 and the sensed current information can be used by the controller for starting the motor in the proper direction.

The timing of the probe voltage pulses is defined by the moment at which the controller 1207 opens or closes the switches. In the embodiments shown, the amplitude of the probe voltage pulses would be determined by the supply voltage VDD.

In embodiments where the amplitude of the probe voltage pulses is variable or adjustable, for example is incrementally increased to avoid movement of the rotor and to avoid demagnetization, (not shown), controlled by a signal from the controller 1207, but other circuits are also envisioned, for example (not shown) the circuit may further comprise an adjustable resistor in series with the switch 1201, which resistor is configured by the controller 1207 to provide a very low resistance during normal operation of the motor, and is configured to a larger resistance value when the probe pulses are applied. The adjustable resistor may comprise one or more switches.

Another way to provide probe voltage pulses with an adjustable amplitude (albeit not perfect rectangular pulses) is to provide a sub-circuit comprising a capacitor, and pre-charging means controlled by the controller 1207 for charging the capacitor with a configurable amount of charge, and a switch for discharging the charge stored on the capacitor in the coil until said switch is closed again, hence defining a pulse duration.

Other features may be comprised in the present invention, such a comparator for comparing the measurements, a microprocessor, lookup tables and memory modules such as programmable memories, an output of the results, for example to a controller for an effective startup of the motor, once the position of the rotor is determined. The driver and processor may be integrated in a circuit, for example a printed circuit board.

Figure 13A:
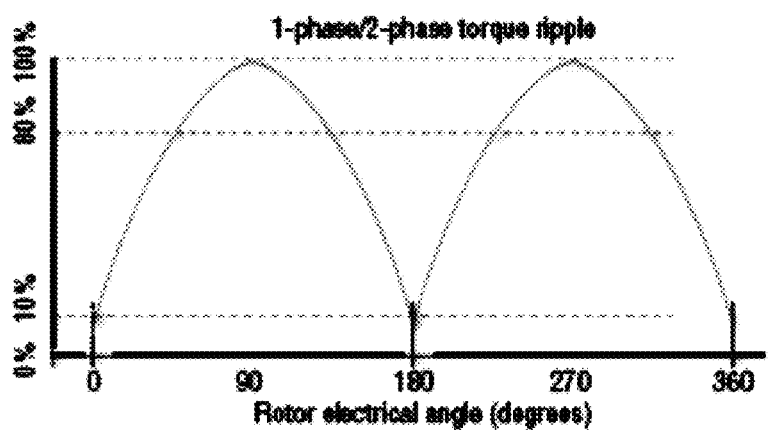
FIG. 13(a) shows a typical torque as a function of angular position for a single-phase or two-phase BLDC motor.
Figure 13B:
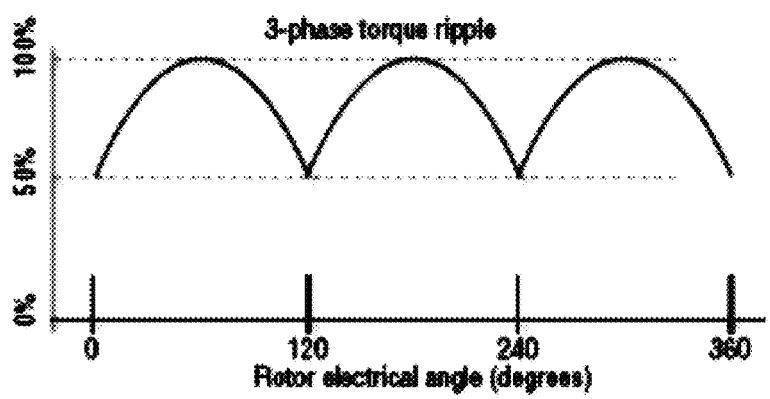
FIG. 13(b) shows a typical torque for a three-phase BLDC motor.

FIG. 13 shows typical torque for a 1-coil motor and a 3-phase motor, and was discussed above.

Figure 14:
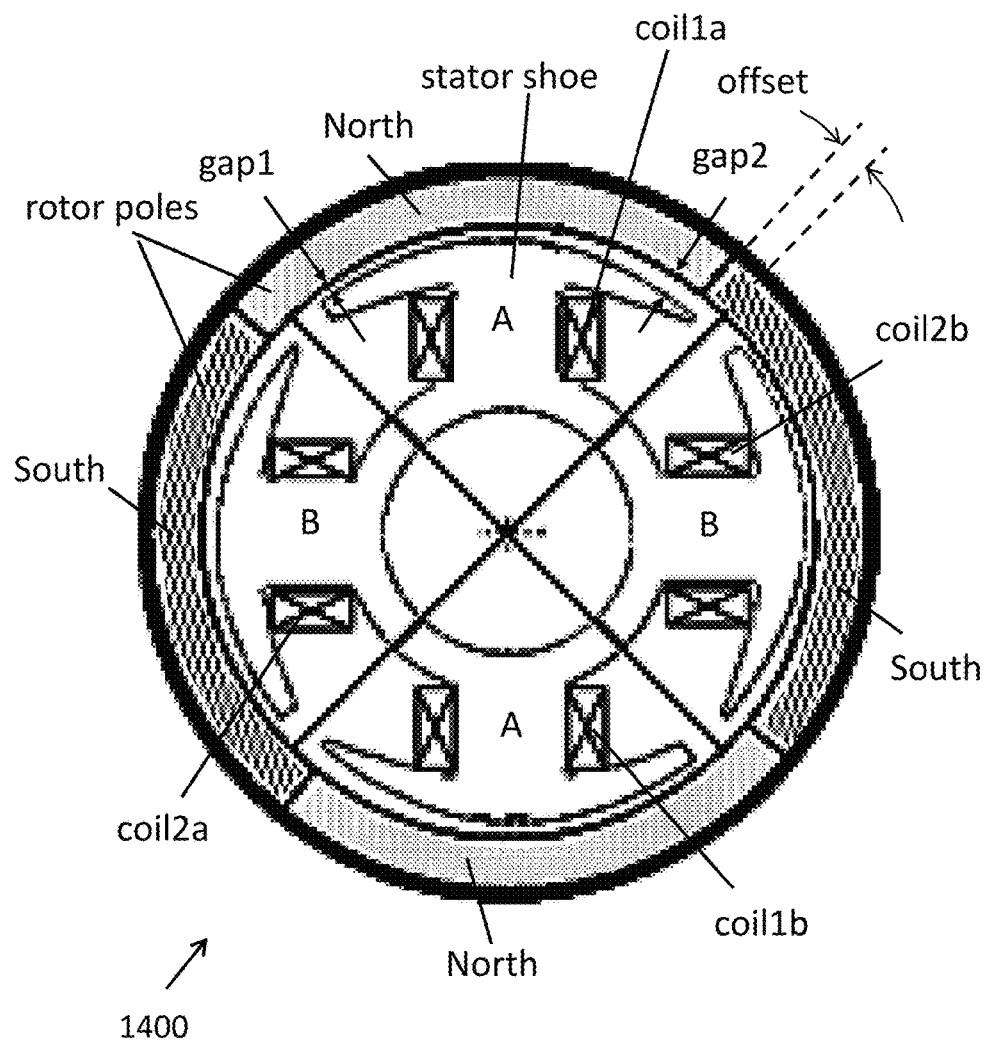
FIG. 14 shows an example of a 2-coil DC motor with no parallel winding.

FIG. 14 shows an example of a 2-coil motor without parallel wound coils, as can be used in the present invention. The stator has four stator shoes, around which a first coil A and a second coil B are wound, in manners known per se in the art. The rotor consists of four magnet poles, two North and two South poles. It is pointed out that the gap "gap1" between the stator shoes and the rotor poles is not constant, but is deliberately made asymmetric (gap2 is larger than gap1). This will make sure that the motor does not stop in a zero-torque position, but in a position slightly offset. If the motor is started in the correct position, the motor will move away from the zero-torque position, and will have gained sufficient momentum to pass the zero-torque position.

Figure 15A:
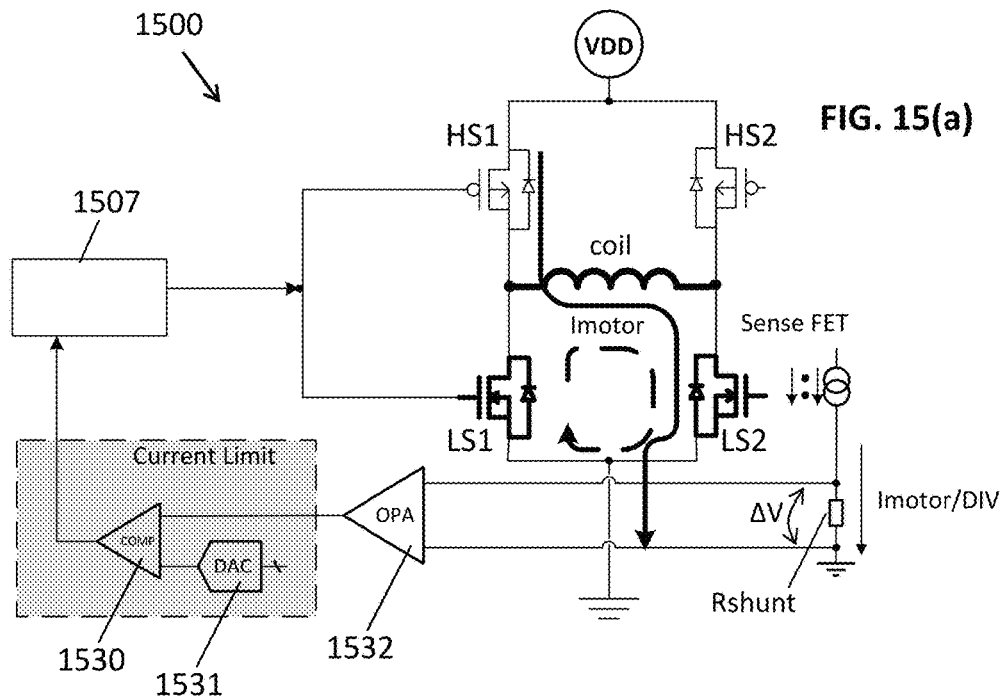
FIG. 15(a) shows another embodiment of a drive circuit according to an embodiment of the present invention.

FIG. 15 shows a block-diagram of a motor driver circuit according to an embodiment of the present invention. The circuit comprises drive transistors, connected in series between the coil(s) and a power supply VDD. In the example shown, the high-side transistor HS1 and the low-side transistor LS1 are driven complementary, but that is not absolutely required, and it may be advantageous to use two separate control signals. In the example shown, transistor HS1 is closed and LS1 is open, HS2 is open, and LS2 is closed. This will cause the current to flow from the supply voltage to ground as indicated by the black arrow.

The circuit also comprises a current sensor. In this example, a current mirror is used, and the current through the coil is measured using a shunt resistor Rshunt, which will generate a voltage ΔV, which is amplified by a differential amplifier. (represented by OPA, but passive components around the OPA are not shown). The output of the differential amplifier is input to a "current limiter". The current limiter may comprise a comparator 1530, one input representative of the current through the coil (derived from the shunt voltage), and another input generated by a reference voltage, for example generated by a DAC 1531, but another reference voltage could also be used. The output of the comparator indicated whether the current flowing through the coil is smaller or larger than the value set by the DAC. The output of the comparator 1530 goes to a controller 1507, which may be implemented for example as a state-machine. The input to the DAC may be generated by the state-machine 1507.

Figure 15B:
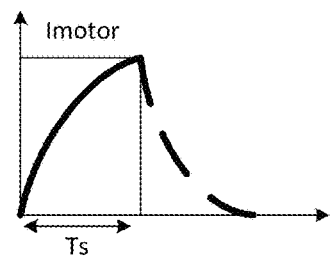
FIG. 15(b) shows an exemplary current pulse flowing through the coil.

FIG. 15(b) shows a typical example of a current pulse flowing through the coil.

Figure 15C:
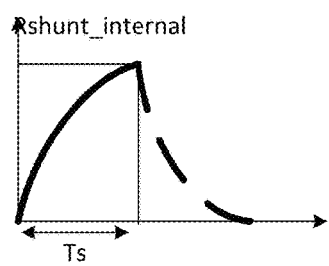
FIG. 15(c) shows an exemplary current pulse flowing through a shunt resistor.

FIG. 15(c) shows a typical example of the current measured by the shunt resistor.

Figure 16:
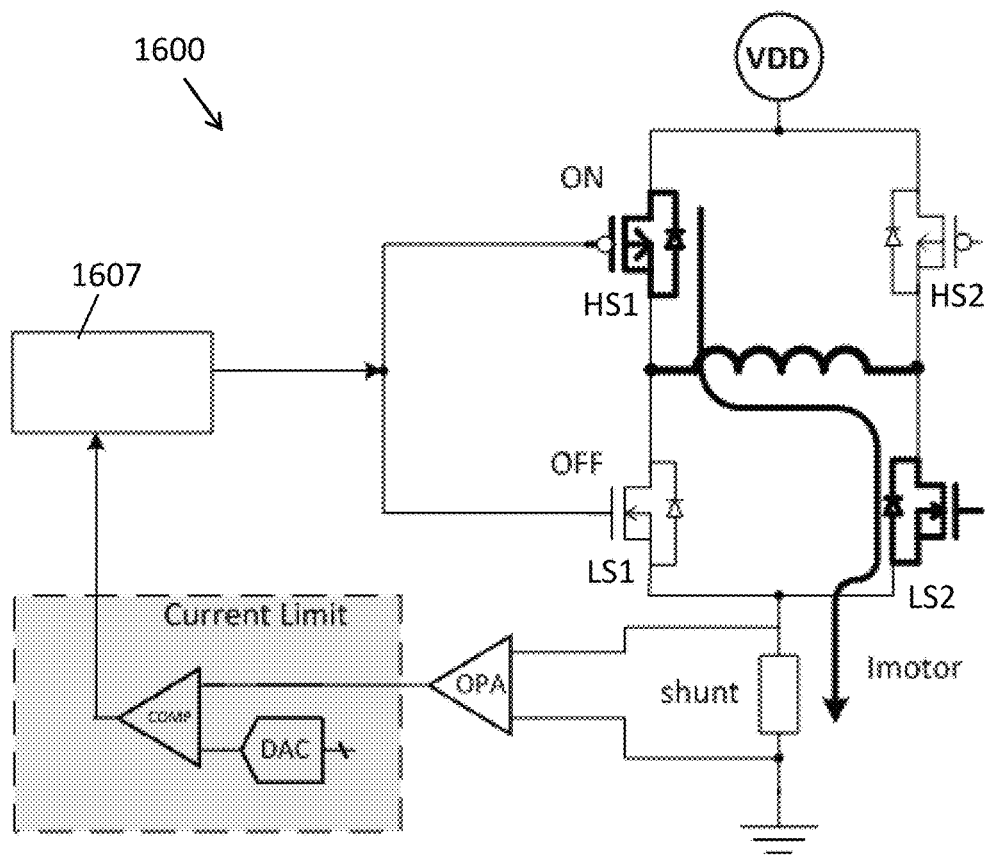
FIG. 16 shows a variant of the drive circuit of FIG. 15.

FIG. 16 is a variant of the schematics of FIG. 15. The only difference between this schematic and that of FIG. 15 being that no current mirror is used, but the shunt resistor is connected between the power transistors and ground. Everything else described for the circuit shown in FIG. 15 is also applicable here.

Figure 17A:
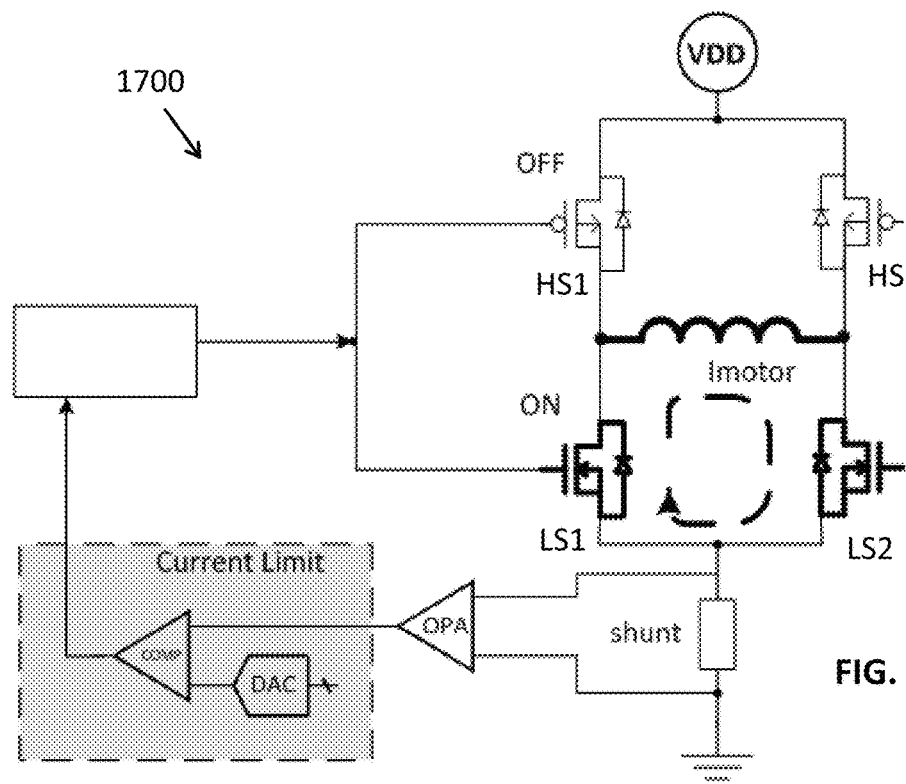
FIG. 17(a) shows a variant of the drive circuit of FIG. 15.

FIG. 17 shows the circuit of FIG. 16 when both high-side transistors HS1, HS2 are OFF (switch OPEN) and both low-side transistors LS1, LS2 are ON (switch closed). This situation illustrates "the tail" of the current pulse (when its amplitude decreases), after the voltage pulse has stopped.

Figure 17B:
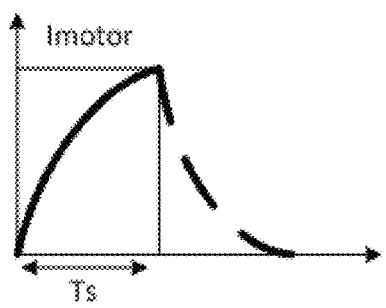
FIG. 17(b) shows an exemplary current pulse flowing through the coil.
Figure 17C:
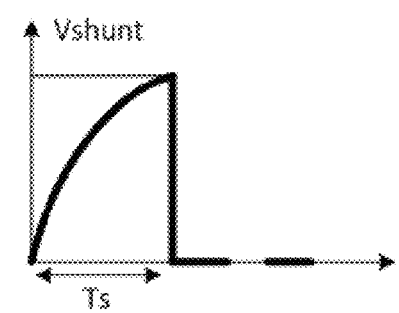
FIG. 17(c) shows an exemplary current pulse flowing through a shunt resistor.

FIG. 17(b) shows an example of a current pulse flowing through the coil. FIG. 17(c) shows a typical example of the current measured by the shunt resistor. As can be seen, when the current decays, no current is measured by the shunt resistor.

The invention claimed is:

1. A method of determining an initial position of a single-phase DC motor, or of a two-phase DC motor without parallel wound coils, the motor having a stator comprising magnetic material and at least one but less than three coils, and a rotor movably mounted with respect to the stator, the method comprising the steps:
   a) applying at least one first probe pulse to the at least one coil thereby generating a first response pulse having a first direction or a first polarity, and measuring an effect of the at least one first probe pulse;
   b) applying at least one second probe pulse to the at least one coil thereby generating a second response pulse having a second direction or second polarity, and measuring an effect of the at least one second probe pulse; wherein the at least one first probe pulse and the at least one second probe pulse have a shape and size sufficiently small for not moving the rotor relative to the stator, and have a shape and size sufficiently large so as to cause at least partial saturation of the magnetic stator material;
   c) determining an initial position of the rotor with respect to the stator by comparing the measured effect of the at least one first probe pulse and the measured effect of the at least one second probe pulse.

2. The method according to claim 1, wherein the shape and size of the at least one first probe pulse and the shape and size of the at least one second probe pulse is a single predetermined shape and size.

3. The method according to claim 1, further comprising a step d) preceding step a) of selecting a probe pulse from a set of predefined probe pulses, step d) comprising the steps of:
   i) measuring a temperature or a temperature dependent value;
   ii) comparing the measured temperature or the measured temperature dependent value with at least one predefined value from a set of predefined values;

iii) depending on an outcome of the comparison, choosing one predefined shape and size from the set of predefined probe pulses;

or step d) comprising the steps of:

iv) measuring a selection value stored in a non-volatile memory-location;

v) depending on the selection value, choosing one predefined shape and size from the set of predefined probe pulses.

4. The method according to claim 1, wherein step a) and step b) comprise:

applying a first respectively second probe pulse and having a first predetermined shape and size, optionally based on a measured temperature or a temperature dependent value or a selection value measured from a non-volatile memory;

and wherein the method further comprises a step e) following step b) and preceding step c), comprising:

e) repeating at least once step a) and step b) using a subsequent or further first and second probe pulse and having a second or further shape and size different from the shape and size used in a previous iteration, and wherein the method further comprises a step f) following step e), comprising:

f) to determine whether partial saturation of the magnetic stator material has occurred or has occurred in a predefined degree based on the measured effect of the at least one first probe pulse and the measured effect of the at least one second probe pulse, and if partial saturation has not occurred or has not occurred in the predefined degree, to continue with step e) of performing another iteration with an increased shaped and/or size as was used in the previous iteration, and if partial saturation has occurred or has occurred in the predefined degree, to continue with step c) of determining the position.

5. The method according to claim 1, wherein measuring the effect of the at least one first probe pulse comprises measuring a first rise time of the at least one first response pulse to reach a predefined first amplitude level, and wherein measuring the effect of the least one second probe pulse comprises measuring a second rise time of the at least one second response pulse to reach a predefined second amplitude level, and wherein comparing the measured effect comprises comparing the first rise time and the second rise time.

6. The method according to claim 1, wherein measuring the effect of the at least one first probe pulse comprises determining a first time period between a first moment in time at which the first response pulse reaches a first predefined amplitude level, and a second moment in time at which the first response pulse reaches a second predefined amplitude level higher than the first predefined amplitude level, and wherein measuring the effect of the at least one second probe pulse comprises determining a second time period between a third moment in time at which the second response pulse reaches a third predefined amplitude level, and a fourth moment in time at which the second response pulse reaches a fourth predefined amplitude level higher than the third predefined amplitude level, and wherein comparing the measured effect of the at least one first probe pulse and effect of the at least one second probe pulse comprises comparing the first time period and the second time period.

7. The method according to claim 5, wherein step a) comprises stopping the first probe pulse as soon as the first response pulse has reached a predefined level, and wherein step b) comprises stopping the second probe pulse as soon as the second response pulse has reached a predefined level.

8. The method according to claim 6, wherein step a) comprises stopping the first probe pulse as soon as the first response pulse has reached a predefined level, and wherein step b) comprises stopping the second probe pulse as soon as the second response pulse has reached a predefined level.

9. The method according to claim 1, wherein measuring the effect of the at least one first probe pulse comprises measuring a first peak level reached by the first response pulse, and wherein measuring the effect of the at least one second probe pulse comprises measuring a second peak level reached by the second response pulse, and wherein comparing the measured effect of the at least one first probe pulse and effect of the at least one second probe pulse comprises comparing the first current peak level and the second current peak level.

10. The method according to claim 1, wherein measuring the effect of the at least one first probe pulse comprises measuring a first amplitude reached by the first response pulse at a first predefined moment in time, and measuring a second amplitude level reached by the first response pulse at a second predefined moment in time, later than the first predefined moment in time, and determining a first amplitude difference as the second amplitude level minus the first amplitude level; and wherein measuring the effect of the at least one second probe pulse comprises measuring a third amplitude reached by the second response pulse at a third predefined moment in time, and measuring a fourth amplitude level reached by the second response pulse at a fourth predefined moment in time later than the third predefined moment in time, and determining a second amplitude difference as the fourth amplitude level minus the third amplitude level; and wherein comparing the measured effect of the at least one first probe pulse and effect of the at least one second probe pulse comprises comparing the first amplitude difference and the second amplitude difference.

11. The method according to claim 1, further comprising the step of:

energizing the rotor by applying a plurality of energizing pulses to the at least one coil, based on the determined initial position of the rotor.

12. A motor drive circuit for performing the method of claim 1, the motor drive circuit comprising:

a pulse generator unit adapted for applying at least one first probe pulse to the at least one coil for generating a first response pulse having a first direction or polarity, and for applying at least one second probe pulse to the at least one coil for generating a second response pulse having a second direction or polarity;

a measurement unit for measuring an effect of the at least one first probe pulse and for measuring an effect of the at least one second probe pulse;

a controller adapted for comparing the measured effect of the at least one first probe pulse and the measured effect of the at least one second probe pulse, and for determining the initial position of the rotor with respect to the stator based on a result of the comparison.

13. The motor drive circuit according to claim 12, wherein the pulse generator unit is adapted for applying a first and second probe pulse having a predefined shape and size; or
- wherein the pulse generator unit is adapted for selectively applying a first and second probe pulse selected from a limited number of probe pulses having a different predefined shape and size; or
- wherein the pulse generator unit is adapted for applying a first and second probe pulse having a first predefined shape and size, and for applying a first and second probe pulse having a second predefined shape and size different from the first shape and size, and for optionally applying a first and second probe pulse having a further predefined shape and size different from the shape and size used in a previous iteration; and wherein the motor drive circuit further comprises circuitry for determining a degree of non-linearity of the measured results.

14. The motor drive circuit according to claim 12, further comprising a current measurement unit or a voltage measurement unit for measuring a current amplitude level or a voltage amplitude level, and/or
- further comprising a peak current detector for measuring a current peak level or a peak voltage detector for measuring a voltage peak level, and/or
- further comprising a timer unit for measuring time or a time period.

15. The motor drive circuit according to claim 14, wherein the timer unit optionally comprises a digital or analog capture timer, and/or,
- wherein the current measurement unit and/or the voltage measurement unit and/or the peak current detector and/or the peak voltage detector comprises a shunt resistor and/or a current mirror in combination with an ADC, or a current limiting comparator, or any combination of ADC and comparators;
- and optionally further comprising a power stage comprising at least one transistor adapted for providing a plurality of energizing pulses to the at least one coil.

16. A motor assembly comprising:
- a single-coil motor or a 2-coil motor without parallel windings, and
- the motor drive circuit according to claim 12, connected to said motor assembly.

* * * * *